(12) United States Patent
Kolar et al.

(10) Patent No.: US 9,331,561 B2
(45) Date of Patent: May 3, 2016

(54) METHOD TO MINIMIZE INPUT CURRENT HARMONICS OF POWER SYSTEMS SUCH AS ESP POWER SYSTEMS

(75) Inventors: Johann Walter Kolar, Zurich (CH); Thiago Batista Soeiro, Zurich (CH); Jürgen Biela, Zürich (CH); Per Ranstad, Vaxjo (SE); Jörgen Linner, Växjö (SE)

(73) Assignee: ALSTOM Technology Ltd, Baden (CH)

( * ) Notice: Subject to any disclaimer, the term of this patent is extended or adjusted under 35 U.S.C. 154(b) by 668 days.

(21) Appl. No.: 13/701,086

(22) PCT Filed: Jun. 1, 2011

(86) PCT No.: PCT/EP2011/059131
§ 371 (c)(1),
(2), (4) Date: Mar. 25, 2013

(87) PCT Pub. No.: WO2011/157567
PCT Pub. Date: Dec. 22, 2011

(65) Prior Publication Data
US 2013/0201727 A1    Aug. 8, 2013

(30) Foreign Application Priority Data

Jun. 18, 2010    (EP) .................................... 10166572

(51) Int. Cl.
*H02M 1/12*    (2006.01)
*H02J 3/01*    (2006.01)

(52) U.S. Cl.
CPC .. *H02M 1/12* (2013.01); *H02J 3/01* (2013.01); *Y02E 40/40* (2013.01)

(58) Field of Classification Search
CPC ............. H02M 1/12; H03J 3/01; Y02E 40/40
See application file for complete search history.

(56) References Cited

U.S. PATENT DOCUMENTS

| | | | | | |
|---|---|---|---|---|---|
| 3,534,247 | A | * | 10/1970 | Miljanic | 323/357 |
| 4,506,259 | A | * | 3/1985 | Rhodes | 340/640 |
| 5,161,241 | A | * | 11/1992 | Kanai | 363/65 |
| 5,233,509 | A | * | 8/1993 | Ghotbi | 363/89 |
| 5,352,930 | A | * | 10/1994 | Ratz | 307/43 |

(Continued)

FOREIGN PATENT DOCUMENTS

| | | |
|---|---|---|
| CN | 2779702 Y | 5/2006 |
| CN | 101075783 A | 11/2007 |

OTHER PUBLICATIONS

"IEEE Recommended Practice for power and grounding Electric Equipment" 2005.*

(Continued)

*Primary Examiner* — Thienvu Tran
*Assistant Examiner* — Pinping Sun
(74) *Attorney, Agent, or Firm* — Rita D. Vacca

(57) ABSTRACT

Disclosed is a method for the improvement of the line quality in a system, in which a common feeding (1), via at least one distribution transformer (3), feeds at least two non-linear loads (11) drawing non-sinusoidal currents from the common feeding (1), wherein between the common feeding (1) and the distribution transformer (3) there is at least one primary side transformer line (2) and between the at least one distribution transformer (3) and the loads (11) there is at least one lower voltage secondary side transformer line (22), wherein at least one active filter (24) attached to at least one lower voltage secondary side transformer line (22) is used for the attenuation or elimination of higher order harmonics experienced by the common feeding (1). Furthermore a high power distribution system for use of such a method is disclosed, in particular for the operation of an electrostatic precipitator.

12 Claims, 17 Drawing Sheets

(56) References Cited

U.S. PATENT DOCUMENTS

| | | | | |
|---|---|---|---|---|
| 5,625,543 | A * | 4/1997 | Barrett | 363/44 |
| 5,656,924 | A * | 8/1997 | Mohan et al. | 323/210 |
| 5,731,965 | A * | 3/1998 | Cheng et al. | 363/41 |
| 6,040,689 | A * | 3/2000 | Gluszek | 324/127 |
| 6,072,708 | A * | 6/2000 | Fischer | 363/84 |
| 6,720,741 | B2 * | 4/2004 | Crouse et al. | 315/289 |
| 6,847,211 | B1 * | 1/2005 | Muhitch et al. | 324/601 |
| 6,861,897 | B1 * | 3/2005 | Cheng et al. | 327/552 |
| 7,269,038 | B2 * | 9/2007 | Shekhawat et al. | 363/71 |
| 2003/0227364 | A1 * | 12/2003 | Li et al. | 336/182 |
| 2009/0129124 | A1 * | 5/2009 | Ranstad | 363/17 |

OTHER PUBLICATIONS

Lawhead, "Three Phase Transformer winding Configurations and differential Relay compensation" May 2006, Annual Georgia Tech Protective Relay conference, p. 1-37.*

Hoadley F L, "Curb the disturbance", IEEE Industry Applications Magazine, IEEE Service Center, Piscataway, NJ, US, vol. 14, No. 5, Sep. 1, 2008, pp. 25-33, XPO11233826.

"IEEE Recommended Practice for Powering and Grounding Electronic Equipment; IEEE Std 1100-1999)", IEEE Standard, IEEE, Piscataway, NJ, USA, May 24, 2006, pp. 213-214, XP002611028.

Green T C et al, "Control techniques for active power filters", IEE Proceedings: Electric Power Application, Institution F Electrical Engineers, GB, vol. 152, No. 2, Oct. 25, 2004, pp. 369-381, XP006023694.

European Search Report, EP Patent Application No. 10166572, Search Completion Nov. 24, 2010, Munich.

International Search Report, International Searching Authority, PCT Application No. PCT/EP2011/059131, Search Completion Oct. 17, 2011, Authorized Officer: Harri Maki-Mantila.

* cited by examiner

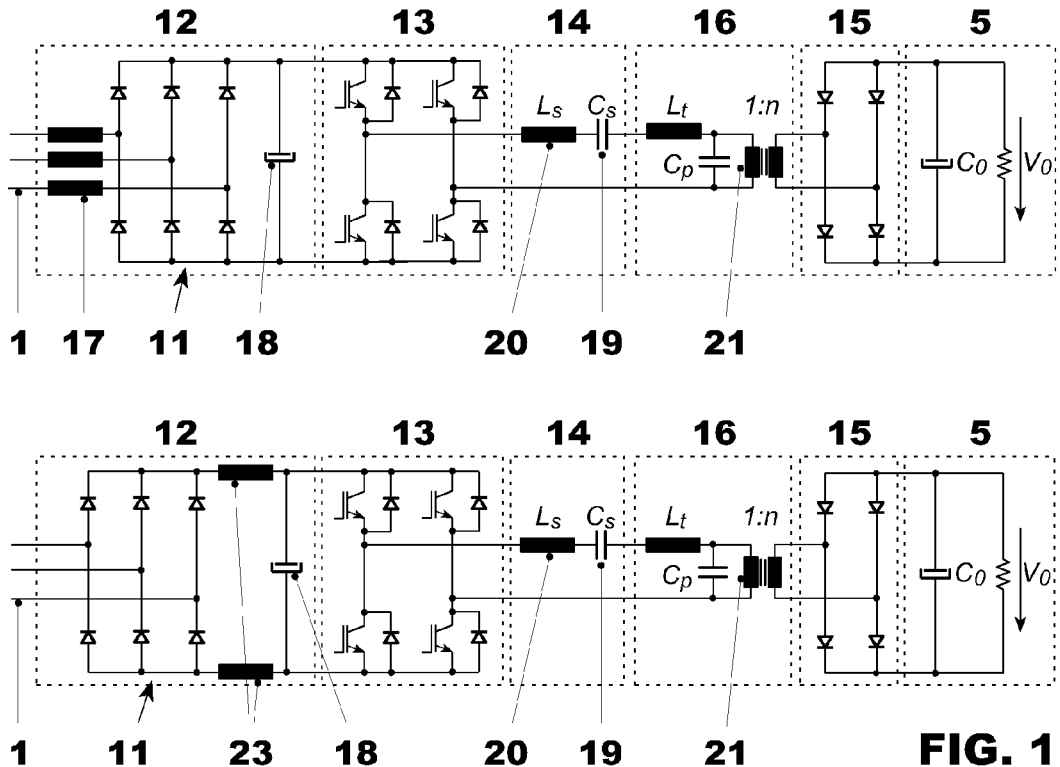
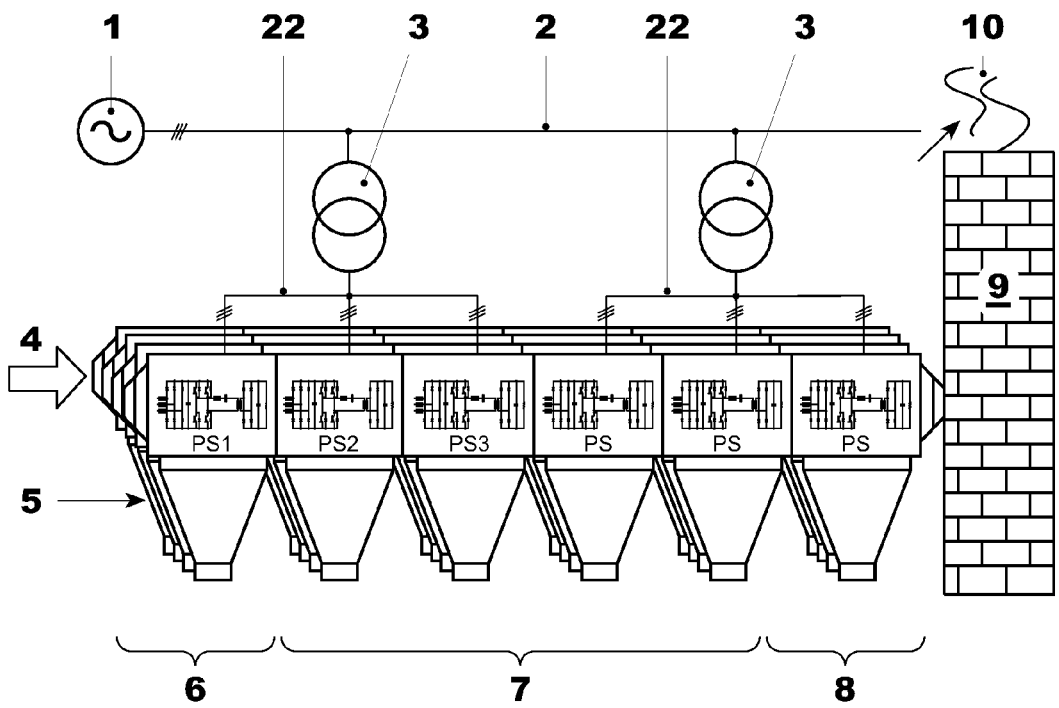
FIG. 1
FIG. 2

![US 9,331,561 B2]

METHOD TO MINIMIZE INPUT CURRENT HARMONICS OF POWER SYSTEMS SUCH AS ESP POWER SYSTEMS

This is a US National Phase application claiming priority to International Application No. PCT/EP2011/059131 having an International Filing Date of Jun. 1, 2011, incorporated herein in its entirety by reference.

TECHNICAL FIELD

The present invention relates to a method for the improvement of the line quality for power distribution systems distributing to non-linear loads such as transistor based ESP power supplies. It furthermore relates to a distribution system implementing such a method and in particular to the use of such a distribution system for the operation of an electrostatic precipitator unit.

PRIOR ART

With the increasing concern for environmental pollution, the reduction of particle emissions by using Electrostatic Precipitators (ESPs) is a highly important issue for coal fired power plants. ESPs are highly suitable dust collectors. Their design is robust and they are very reliable. Moreover, they are most efficient. Degrees of separation above 99.9% are not unusual. Since, when compared with fabric filters, their operating costs are low and the risk of damage and stoppage owing to functional disorders is considerably smaller, they are a natural choice in many cases. In an ESP, the polluted gas is conducted between electrodes connected to an ESP power supply. Usually, this is a high-voltage transformer with thyristor control on the primary side and a rectifier bridge on the secondary side. This arrangement is connected to the ordinary AC mains and thus is supplied at a frequency, which is 50 or 60 Hz. The power control is performed by varying the firing angles of the thyristors. The smaller the firing delay, i.e. the longer the conducting period, the more current supplied to the ESP and the higher the voltage between the electrodes of the ESP. Modern ESPs are divided into several bus sections for increasing the collection efficiency. Each of these bus sections has its own power supply (PS), which is controlled individually and has a typical output power range of 10-200 kW and an output voltage range of 30-150 kVDC.

Modern ESP's power supplies are often based on resonant converters in order to utilize the transformer's nonidealities and to have soft switching for a wide operation range. One exemplary power supply for ESPs is known from US 2009/0129124.

SUMMARY OF THE INVENTION

Correspondingly, the present invention relates to a method for the improvement of the line quality in a power distribution system, in particular for suppressing higher order harmonics generated by non-linear loads powered by the line at the common feeding. The typical applications are high power applications, so cases where the distribution transformer mentioned further below is rated in the range of 30 kVA-3000 kVA.

In this method, a common feeding, via at least one distribution transformer, feeds at least two non-linear loads drawing non-sinusoidal currents from the common feeding. Between the common feeding and the distribution transformer there is at least one primary side transformer line and between the at least one distribution transformer and the loads there is at least one lower voltage secondary side transformer line. At least one active filter attached to at least one lower voltage secondary side transformer line is used for the attenuation or elimination of higher order harmonics experienced by the common feeding. In accordance with the invention, the control of the active filters is based on the measurement of a current sensor on the low voltage level (which should be present in each of the low-level circuits, only measurement and taking into account of the current conditions in each of the low voltage level circuits allows appropriate and complete line power quality improvement). This measurement however is preferentially not directly used as will be outlined further below but only after a computational correction taking the attenuation effect of the transformer itself into account. The active filter(s) so to speak correct the conditions on the low-level side via injection. This correction is however not principally aiming at a correction of harmonics on the low-level size, but rather at a correction of the conditions on the primary side. This is achieved in that the active filters inject into the low-level system in a manner which, so to speak backwards via the transformer and taking its effect into account, corrects the conditions on the high voltage side by eliminating the harmonics, which otherwise if present negatively influence the line power quality and also taking into account phase shifts generated by the transformer. Correspondingly therefore, preferably the currents $i_{L\_n}$ (where the index n stands for the nth secondary side transformer line) in all lower voltage secondary side transformer lines are measured and used for the control of the active filter.

As mentioned above said current $i_{L\_n}$ (or in case of several secondary side lines, the corresponding set of current values as a function of time in the individual secondary side lines) is not directly used as an input reference for the active filter but from said current, using a computational model of the transformer, the current on the primary side transformer line is calculated, and therefrom, using a computational model of the transformer, the current on the secondary side transformer line is back calculated, and this current is used as input reference to the active filter.

In case of only one single secondary side line, the input variable for this back and forth calculation is the above-mentioned current value. In case of more than one secondary side line, so in case there are several transformers transforming from one primary side line to several secondary side lines, the input variable for the calculation of the reference value for the active filter (or the plurality of active filters) is the set of all current values measured in the individual secondary side lines. It is to be noted that in such a case if there are several active filters the reference value for each of these active filters preferentially takes into account and is based on each of the current values measured in each of the secondary side lines.

Interestingly, even if there are two transformers and two secondary side lines, it is not necessary that active filters be present in each of these secondary side lines of the transformer, as long as the currents measured in all secondary side lines are taken as input variables for the active filter. In other words one single active filter is in a position to correct for the effects of each of the secondary side lines on the primary side line.

For primary current prediction (on the primary side transformer line) one can use for a 12 pulse system the following analytical calculation scheme:

$$\begin{vmatrix} i_{Rp} \\ i_{Sp} \\ i_{Tp} \end{vmatrix} = \frac{1}{n_B} \begin{vmatrix} 1 & 0 & -1 \\ -1 & 1 & 0 \\ 0 & -1 & 1 \end{vmatrix} \cdot \begin{vmatrix} i_{LR\_UB} \\ i_{LS\_UB} \\ i_{LT\_UB} \end{vmatrix} + \frac{1}{n_A} \cdot \begin{vmatrix} i_{LR\_UA} \\ i_{LS\_UA} \\ i_{LT\_UA} \end{vmatrix}$$

For the active filter references adjustment (currents without the harmonics which the 12 pulse transformer could mitigate):

For the AF installed on the low voltage side of the transformer with lagged voltage:

$$\begin{vmatrix} i^*_{LR\_UB} \\ i^*_{LS\_UB} \\ i^*_{LT\_UB} \end{vmatrix} = \frac{k_1 n_B}{3} \begin{vmatrix} 1 & -1 & 0 \\ 0 & 1 & -1 \\ -1 & 0 & 1 \end{vmatrix} \cdot \begin{vmatrix} i_{Rp} \\ i_{Sp} \\ i_{Tp} \end{vmatrix}$$

For the AF installed on the low voltage side of the transformer with lead voltage:

$$\begin{vmatrix} i^*_{LR\_UA} \\ i^*_{LS\_UA} \\ i^*_{LT\_UA} \end{vmatrix} = k_2 n_A \cdot \begin{vmatrix} i_{Rp} \\ i_{Sp} \\ i_{Tp} \end{vmatrix}$$

To enable that all active filters installed in each low voltage side of the distribution transformers process similar harmonic amplitudes k1 and k2 are given below:

$$k_1 = \frac{n_A}{n_A + \frac{n_B}{\sqrt{3}}} \quad k_2 = \frac{\frac{n_B}{\sqrt{3}}}{n_A + \frac{n_B}{\sqrt{3}}}$$

For the active filter installed on the lagged voltage transformer:

$$k_1 = 1 \ k_2 = 0$$

For the active filter installed on the lead voltage transformer:

$$k_1 = 0 \ k_1 = 1$$

wherein:

$i_{Rp}$, $i_{Sp}$, $i_{Tp}$, are the predicted MV (medium voltage) side line currents;

$i_{LR\_UA}$, $i_{LS\_UA}$, $i_{LT\_UA}$ are the currents drained by the load installed on the lead transformer (counter clockwise);

$i_{LR\_UB}$, $i_{LS\_UB}$, $i_{LT\_UB}$ are the currents drained by the load installed on the lagged transformer;

$n_A$ is the turns ratio of the lead transformer;

$n_B$ is the turns ratio of the lagged transformer;

$i_{LR\_UA}^*$, $i_{LS\_UA}^*$, $i_{LT\_UA}^*$ are the adjusted current references for active filter installed on the lead transformer (counter clockwise);

$i_{LR\_UB}^*$, $i_{LS\_UB}^*$, $i_{LT\_UB}^*$ are the adjusted current references for active filter installed on the lagged transformer (counter clockwise);

$k_1$, $k_2$ are the coefficients for adjustment of the current amplitudes on the low voltage side of the transformers.

Alternatively the transformer model can be performed using a harmonic detection method such as FFT, DFTT, RDFT or the like, as will be detailed further below.

According to a preferred embodiment of the proposed method and in order to take into account the specifics of the transformer(s), in addition to the above current values measured in each of the individual secondary side lines furthermore synchronization voltages $u_{sync\_n}$ can be measured on the lower voltage secondary side transformer line and can be used to calculate the voltage rms values on the secondary side transformer line. Again as in the case of the measured current values, preferably these voltages are measured in all individually secondary side lines and are taken into account for each of the active filters.

According to yet another preferred embodiment, the distribution transformer is a 12 pulse transformer. This may preferably be selected from the group of Ddn, Dyn, Dzn, Ydn, Yyn, Yzn, with n selected from 0, 1, 5, 6, or 11, or in case of several transformers, combinations thereof.

For a situation where two distribution transformers are present, preferably both are arranged as a 12 pulse transformer, which are transforming from the primary side of the transformer line to two lower voltage secondary side transformer lines. In this case preferentially the 12 pulse transformers are selected from the group Dd0-Dy1, Dy1-Dz2, Yd1-Dd0, Dz0-Dy1.

According to another preferred embodiment, at least two distribution transformers, preferably 12 pulse transformers, are transforming from the primary side of the transformer line to at least two lower voltage secondary side transformer lines, and in at least two lower voltage secondary side transformer lines active filters are located, and preferably each lower voltage secondary side transformer line is equipped with an active filter controlled by reference signals calculated based on measurements in each and every lower voltage secondary side transformer line.

Preferentially, the non-linear load is a transistor based power supply element, e.g. for continuous or pulsed operation, including a switched full bridge inverter, preferably a power supply for an electrostatic precipitator. In this case typically a transistor based power supply element comprises an input rectifier and a transistor based full bridge inverter, optionally followed by a resonant tank and/or a transformer unit and/or an output rectifier, wherein preferably on the input side of the full bridge inverter and/or on its output side smoothing inductors are arranged. However the method is principally suitable for any kind of non-linear load.

The active filter control strategy in principle can be a conventional control strategy because the necessary correction for the behaviour of the transformer is already taken into account by the above-mentioned back and forth computational methods. The control strategy is nevertheless preferably selected from the group of dq-frame, PQtheory, Fryze currents, generalized integrators, frequency domain strategies, in particular DFT, RDFT and FFT. The present invention furthermore relates to a high power distribution system with a common feeding which, via at least one distribution transformer feeds at least two non-linear loads drawing non-sinusoidal currents from the common feeding, wherein between the common feeding and the distribution transformer there is a primary side of the transformer line and between the at least one distribution transformer and the loads there is at least one lower voltage secondary side of the transformer line, and wherein at least one active filter is attached to at least one lower voltage secondary side of the transformer line for the attenuation or elimination of higher order harmonics experienced by the common feeding.

Furthermore according to a preferred embodiment, the proposed distribution system is provided with at least one sensor in at least one lower voltage secondary side of the transformer line sensing the current in said line, which is used for the control of the active filter. Preferably computational means are provided using said current and a computational model of the transformer is implemented in these means to calculate the current on the primary side of the transformer line, and therefrom, using a computational model of the transformer, the current on the secondary side of the transformer line, and this current is then input reference to the active filter(s), optionally taking into account synchronization voltages measured via further (all the same) sensors on the lower voltage secondary side of the transformer line to calculate the voltage rms values on the secondary side of the transformers.

Preferentially, the distribution transformer is a 12 pulse transformer, such as selected from the group of Ddn, Dyn, Dzn, Ydn, Yyn, Yzn, with n selected from 0, 1, 5, 6, or 11, or in case of several transformers combinations thereof. Preferably two distribution transformers are present, typically arranged as a 12 pulse transformer by proper selection, transforming from the primary side of the transformer line to two lower voltage secondary side of the transformer lines, wherein the 12 pulse transformers are selected from the group Dd0-Dy1, Dy1-Dz2, Yd1-Dd0, Dz0-Dy1. There are 26 commercial configurations of three-phase transformer standardized by IEC (all 6 pulses), which can be selected to provide phase shift between primary and secondary windings as a multiple of 30 degrees. In the case where two commercial distribution transformers fed by the same grid are selected with 30 degrees phase-shift, they constitute a 12 pulse system.

Furthermore the present invention relates to an electrostatic precipitator unit comprising a distribution system as outlined above and/or using a method as outlined above.

Last but not least the present invention relates to the use of a method as outlined above and/or a distribution system as outlined above for powering a set of non-linear loads such as for the operation of an electrostatic precipitator unit with at least two, preferably at least six, more preferably at least 12 or 24 power supplies with transistor based full bridge inverter elements.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 shows typical commercial ESP power supplies with: (a) ac-side smoothing inductor; and (b) dc-side smoothing inductor;

FIG. 2 shows a typical ESP system electrical installation;

FIG. 3(a)), $k_1=k_2=0.5$; for only one active filter installed on the Dd0 transformer secondary side (c.f. FIG. 3(b)), $k_1=0$ and $k_2=1$; and for only one active filter installed on the Dy1 transformer secondary side, $k_1=1$ and $k_2=0$, and in c) it shows a schematic of a selective harmonic detection method;

DESCRIPTION OF PREFERRED EMBODIMENTS

Figure 3:
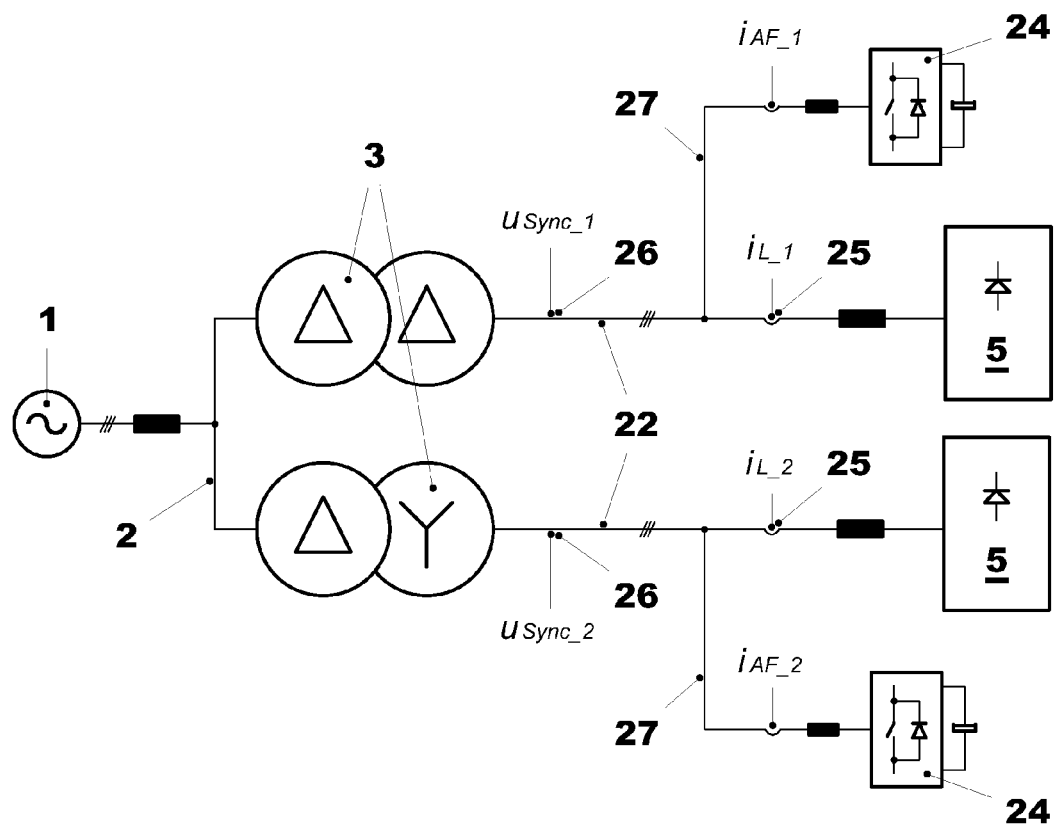
FIG. 3 shows an ESP system using multi-pulse and active filter systems: (a) System using two active filters; and (b) System using one active filter.
Figure 3:
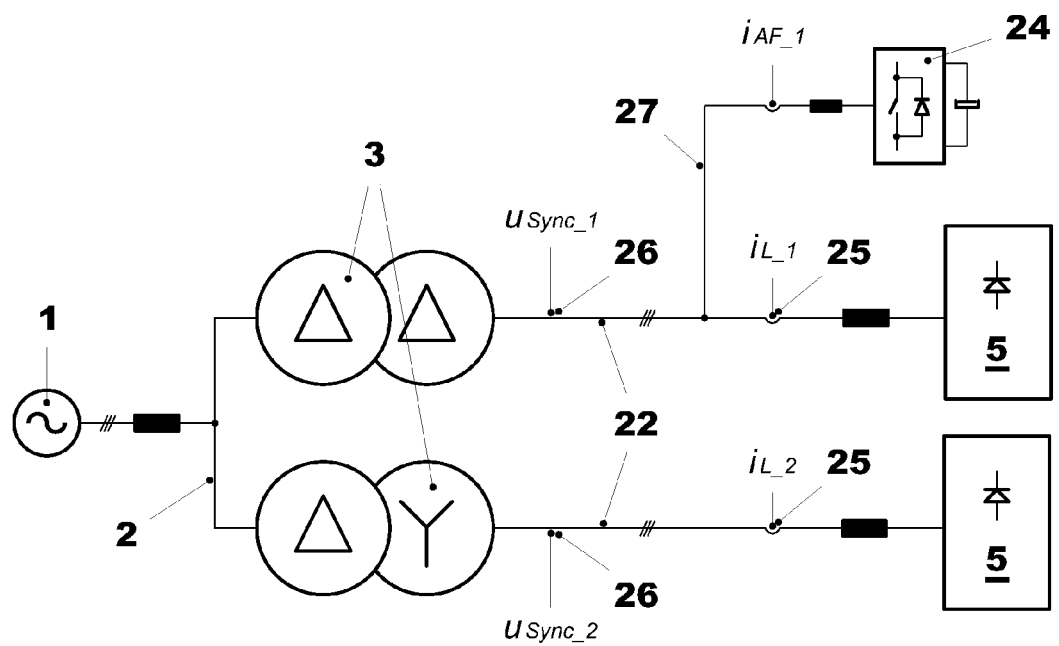

Nowadays, modern ESP's power supplies often employ three-phase diode bridge rectifiers as a front-end converter due to its simplicity, reliability and low cost.

A high frequency three phase power supply 11 for powering one individual bus section in a setup according to FIG. 2 described below is illustrated in FIG. 1. On the input side the power supply 11 is connected to the mains 1 and first comprises an input rectifier 12. At the output side of the input rectifier 12 a direct current (DC) is provided and between the levels there is located a DC link capacitor 18. This direct voltage is then fed trough a full bridge inverter 13 with a number of correspondingly fired transistors. The alternating current on the output side of the full bridge inverter 13 enters a resonant tank 14 and then a transformer unit 16, the resonant circuit given by a series arrangement of a capacitor 19 and an inductor 20 followed in the transformer unit 16 by a transformer 21. On the output side the unit 16 is coupled to an output rectifier 15 the output side of which is then coupled to the electrodes of the electrostatic precipitators 5. For pulsed operation of such a power supply the full bridge inverter is operated in pulsed mode, continuous operation is possible as well A modern ESP power supply uses six-pulse diode bridge rectifiers with ac or dc-side smoothing inductors as front-end converter due their simplicity, reliability and low cost as illustrated in FIG. 1 *a* for a smoothing inductor 17 on the alternating current site and in FIG. 1 *b* for a DC side smoothing inductor 23.

However, such power supplies draw non-sinusoidal currents from the source, deteriorating the mains power quality. This system presents current harmonics of the order $n=(6.i\pm1)$, where i is an integer greater than or equal to one.

So the main drawback of this concept is that diode rectifiers inject significant current harmonics into the power system which can cause overloading of nearby shunt capacitors or a distortion of the mains voltage at the point of common coupling. Therefore, simple rectifiers do not meet the IEEE 519 guidelines concerning input current harmonics.

Especially in pulsed operation, a significantly unbalanced loading of the mains phases could occur. Accordingly, the concept employed today bears the risk of causing severe problems such as malfunction of other equipment fed by the same mains, audible noise, increased losses of transformers, generators and power lines, electric resonances in the mains, and mechanical oscillations in generators.

FIG. 2 shows a typical ESP installation with several sequential bus sections driven by 24 power supplies. The electrostatic precipitator 5 comprises an inlet side trough which a gas flow 4 loaded with particles, e.g. coal dust, enters the ESP. The ESP has an inlet field 6, followed by middle fields 7 and is terminated by an outlet field 8, the outlet of which is connected to a stack 9 through which the cleaned exhaust gas 10 exits to the environment. Each of the fields 6-8 has four cells or rows of individually powered precipitator systems, and to this end e.g. 24 power supplies (PS) are provided for the energisation of the precipitators. The power supplies are energized via the mains 1, which via a low or medium voltage line 2 and distribution transformers 3 and low voltage level lines 22 connects to the individual power supplies. In other words the totality of the power supplies is connected to the same mains system 1 and if these power supplies or at least a fraction thereof are operated in pulsed mode the load on the main can be heavily unbalanced.

In such a setup, 3-phase transformers providing phase shift between the voltages of the primary and secondary windings are employed to feed the ESP's power supplies in a three-wire system. Therefore, a multi-pulse system can be built by selecting suitable distribution transformers, where the simplicity and reliability of ESP power supplies are preserved. However, the performance of a multi-pulse system strongly depends on the load balance between the secondary sides of the transformers, which can be difficult to achieve in an ESP system, since the ESP bus section loading characteristics can vary considerably.

As shown in FIG. 3, to further improve the line quality, ensuring agreement with harmonic guide lines, active filters 24 can be employed; however, they need to cope with the high dynamic loading of the ESP system. Moreover, the location of the active filters 24 plays an important role in the total efficiency of the system and cost of this active solution, i.e. if one installs the active filter 24 in the low or medium-voltage level 2 (primary side of the transformer 3) high voltage rating integrated gated bipolar transistors IGBTs and insulated transducers are required.

This document relates to a highly efficient ESP system configuration schematically illustrated in FIG. 3, which complies with harmonic guidelines. Therein, distribution transformers are chosen to build a multi-pulse system and active filters 24 are installed on the low voltage side 22 of the transformer 3 in order to use standard, low cost IGBTs and circuit components, which also enable a higher switching frequency/efficiency. The active filters 24 are mainly intended for high order harmonic-current-mitigation (>7th harmonic), and for balancing the 5th and 7th current harmonics, which can be effectively eliminated by the multi-pulse system. In fact, the active filter(s) 24 compensate the line current harmonics on the medium voltage side that the 12 pulse system shown in FIG. 3 cannot fully compensate. The ESP system becomes highly efficient because the active structures (active filters 24), only process about 20% of the total system power.

The presented system configuration becomes feasible clue to the proposed mathematical model of the distribution transformer 3 which quickly predicts and adjusts the line current on the LV or MV side 2 as the active filter's 24 current reference, by only sensing the currents of the ESP power supplies on the transformers' LV side 22. Due to the fact that just small calculations are necessary, delays on the reference signal processing are minimized, and control strategies, which are commonly used in active filter solutions, can be adapted without degrading the active filter overall performance.

As illustrated in FIG. 3 *a*) such a setup may comprise one individual active filter 24 on each of two parallel low voltage level secondary sides 22 of the transformer 3. In the alternative however it may also only comprise one active filter in one of the low-level circuits 22 as illustrated in FIG. 3 *b*).

The control of the active filters 24 is based on the measurement of a current sensor 25 on the low voltage level (which in any case must be present in each of the low-level circuits 22, only measurement and taking into account of the current conditions in each of the low voltage level circuits allows appropriate line power quality improvement), which measurement however is not directly used as will be outlined further below but only after a computational correction taking the effect of the transformer 3 into account. The active filter 24 so to speak corrects the conditions on the low-level side 22 via injection by a line 27. This correction is however not principally aiming at a correction of harmonics on the low-level side 22, but rather at a correction of the conditions on the primary side 2. This is achieved in that the active filters inject into the low-level system in a manner which, so to speak backwards via the transformer 3 and taking its effect into account, corrects the conditions on the high voltage side 2 by eliminating the harmonics which otherwise if present negatively influence the line power quality. Using the proposed method also the phase shifts generated by the transformer are taken into account.

In order to improve the line power quality of an ESP system, this invention thus proposes a highly efficient system configuration comprising two parts:

A multi-pulse system 3, which can be built by proper selection of distribution transformers in a typical ESP electrical installation (see FIG. 2). The main objective of this system is to eliminate mainly the 5th and 7th harmonics (but also higher harmonics such as the 17th, the 19th, etc) of the line current on the transformer's low or medium voltage side 2 (primary side of the transformers).

Active Filters 24 intended for high order harmonic-current-mitigation (>7th harmonic), and for balancing the 5th and 7th current harmonics, which can then be effectively eliminated by the multi-pulse system 3 in cases where the transformers' loading are unbalanced. The active filters 24 are installed on the low voltage transformer side in order to use standard low cost IGBTs and circuit components with better loss characteristics.

As illustrated in FIG. 3, both systems comprise two medium voltage/low voltage distribution transformers 3 configured as a multi-pulse system (Dd0 and Dy1 in this example) feeding two typical commercially available ESP power supplies 11 (see also FIG. 1) and shunt active filters 24 installed on the low voltage side of the transformer 3. As can be observed, there is the possibility of using one (FIG. 3 b) or more active filter structures 24 (FIG. 3 a). The selection of one or more active filters 24 and of their design is mainly dependent on the necessary amount of reactive power the active filter 24 needs to handle in order to provide high line power quality, which is about 20% of the total system power in case of 2 active filters 24 (see FIG. 3a).

Figure 4:
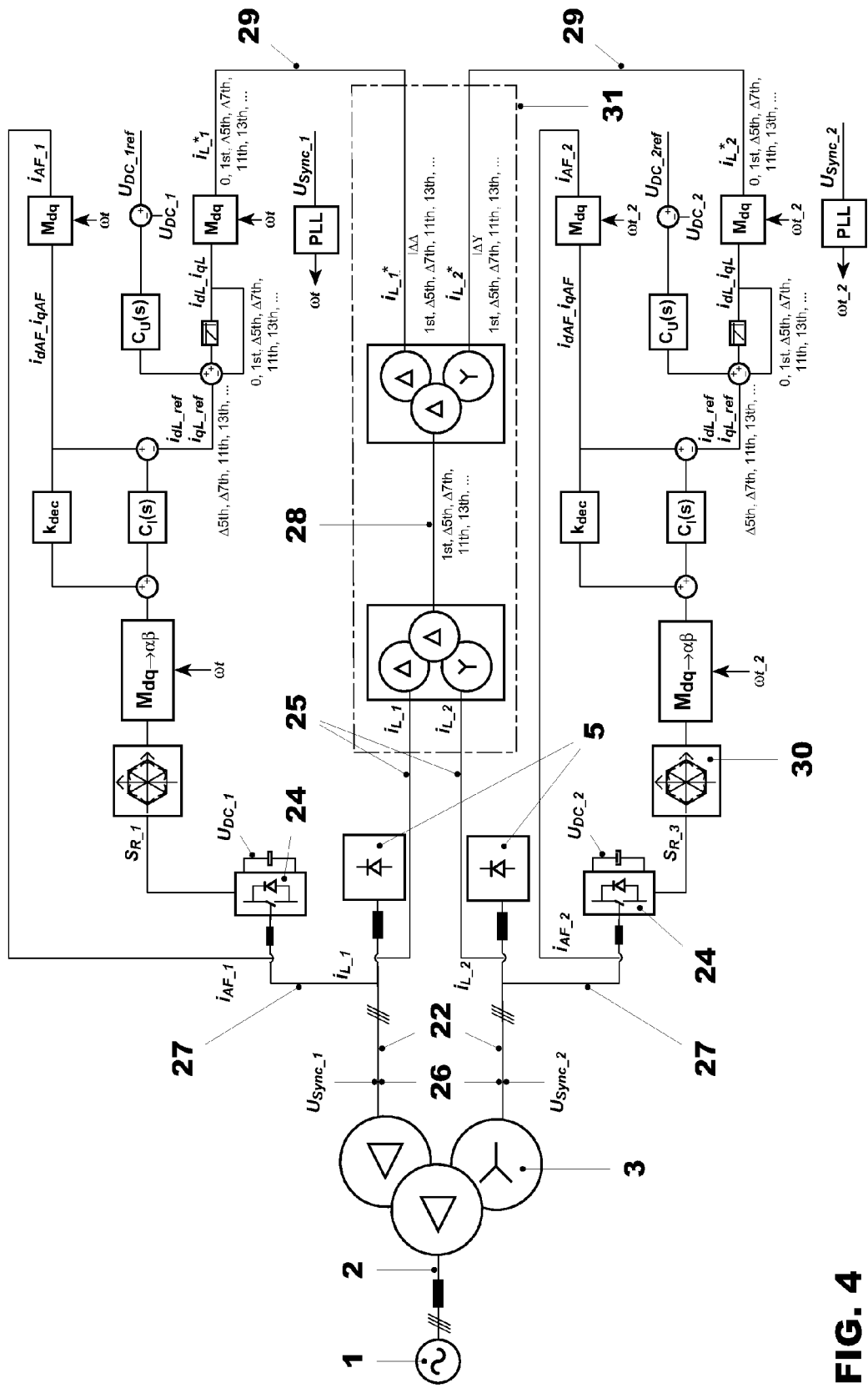
FIG. 4 shows a proposed ESP system control strategy
Figure 5A:
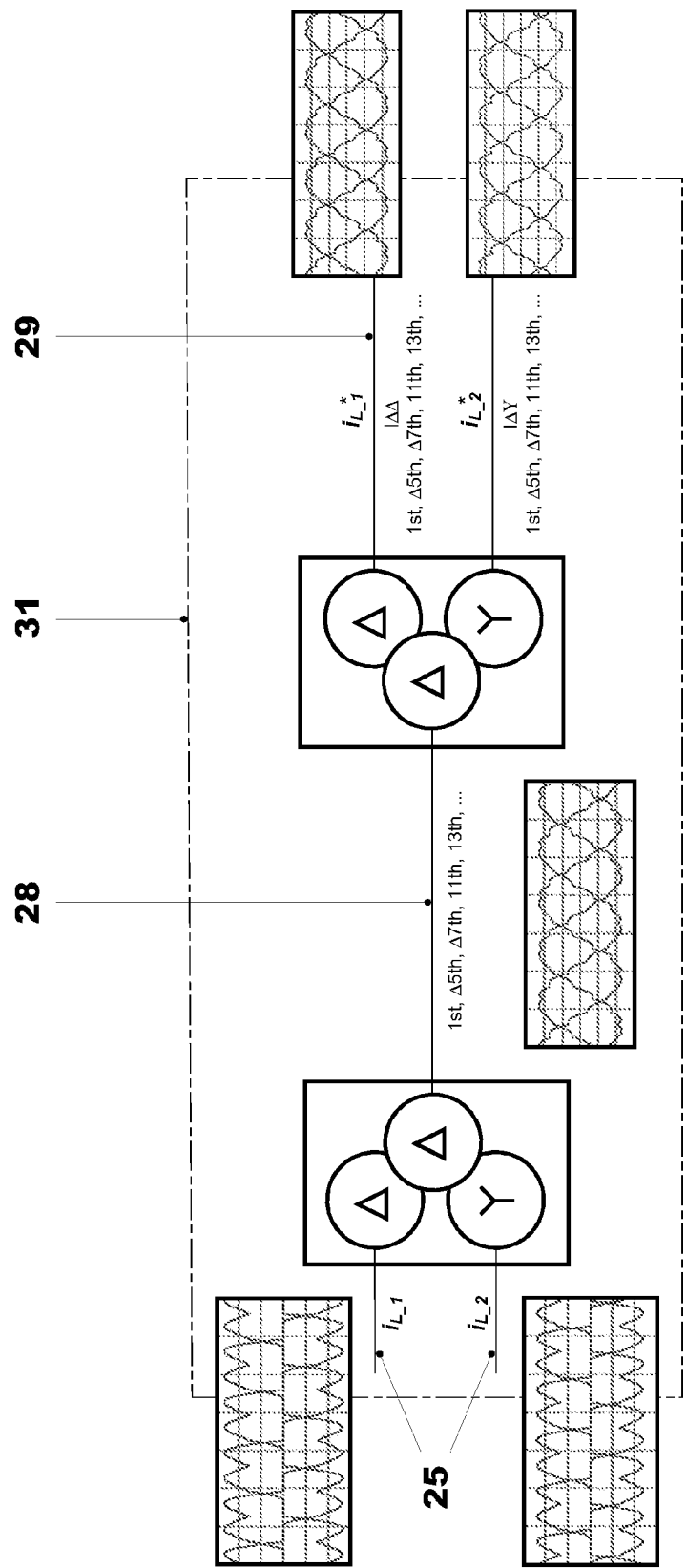
FIG. 5 shows in a) and b) the transformer current model, where n represents the transformer turns ratio, wherein $i_{L\_1}$ represents $i_{L,R\_UA}$, $i_{L,S\_UA}$ and $i_{L,T\_ua}$ and wherein $i_{L\_2}$ represents $i_{L,R\_UB}$, $i_{L,S\_UB}$ and $i_{L,T\_UB}$; for the case where 2 active filters are used (c.f.
Figure 5B:
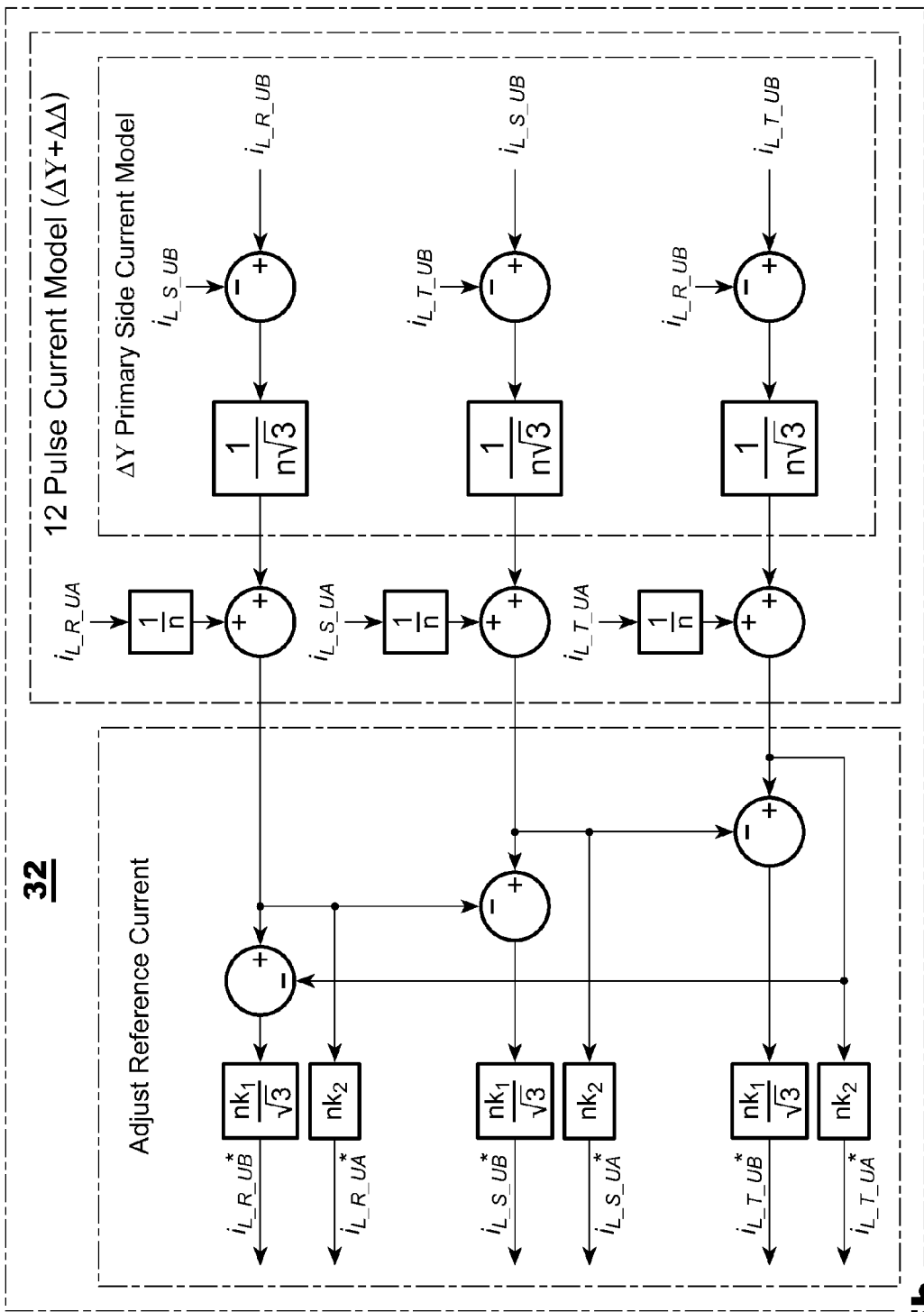

In order to enable the active filter operation on the low voltage side of the transformer, the active filters units 24 need to predict or directly sense the current on the transformer's 3 low or medium voltage side 2. Thereby, a special adjustment in a typical active filter 24 current reference generation strategy is proposed to avoid measurements on the low or medium voltage transformer side 2 as shown in FIGS. 4 and 5. The basic idea is that all the active filters 24 equally compensate the harmonics, which could not be eliminated by the multi-pulse transformer 3. Thereby, instead of using directly the ESP power supply currents $i_{L\_1}$ as reference for the active filters 24, as would be done by a traditional harmonic detection method, the proposed control strategy uses the current generated by a mathematical model of the transformer 3. This model predicts the line currents in the transformer medium voltage side 2 by sensing the ESP power supplies currents $i_{L\_1}$ in the low voltage side 22 of the transformer (see also FIG. 5). These currents $i_{L\_1}$ carry the information of the harmonics that need to be filtered (harmonics that the transformers 3 could not fully compensate). By adjusting proportionally the predicted currents to the low voltage side 22 of the transformer 3 according to the transformer turn ratio and configuration, the reference of each active filter 24 will be the same, but includes the transformer waveform phase-shift (30 degree in the 12 pulse system case).

Summarizing, the main functions of the transformer model are:

1) Mathematically subtract from the measured current $k_1$ the harmonics which the multi-pulse transformer would eliminate; and
2) To adjust the current reference according to the transformer side, where the active filter 24 is located, with proper phase shift and magnitude.

It is important to mention that the current model of the transformer 3 is also valid for other 12 pulse system configurations, such as Dy1-Dz2, Yd1-Dd0, Dz0-Dy1, etc. For other cases, the new transformer, which has the lead secondary voltage (counterclockwise orientation), takes the role of the Dd0 transformer and the lagged one takes the position of the Dy1 transformer in the current model.

For the primary current prediction (on the primary side transformer line) and the active filter references adjust the above explained analytical calculation scheme can be used.

Due to the fact that only small calculations are necessary, delays on the reference signal processing are minimized and control strategies, which are commonly used in active filter 24 solutions, can be adapted without degrading the active filter 24 overall performance.

The active filter 24 control strategy used here was the dq-frame (see also B. Kaku et al., IEEE Proceedings, electric power applications, Vol. 144, pp 182-190, 1997); however other strategies such as PQ-theory, Fryze currents, generalized integrators, frequency domain strategies (DFT, RDFT and FFT), etc, could also be employed. In addition, the synchronization voltages $u_{Sync\_1}$ and $U_{Sync\_2}$ can further be used to adjust asymmetries on the transformer windings coupling, by modifying the model's transformer turns ratio n for each single phase.

Figure 5C:
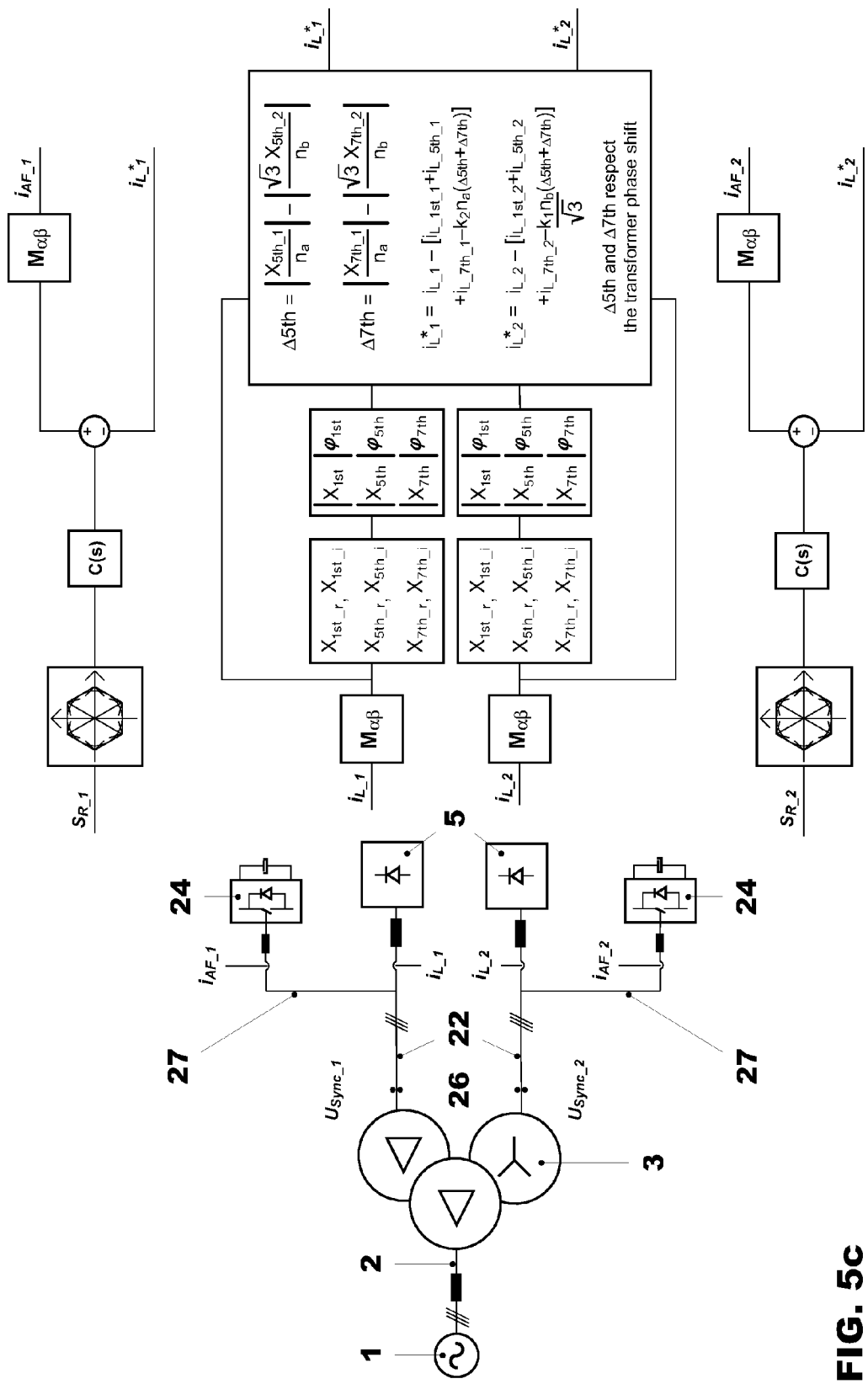

As mentioned above, there are alternative ways to perform the transformer current model, e.g. by using a harmonic detection method such as FFT, DFT, RDFT, etc:

So alternatively, e.g. selective harmonic detection methods, such as FFT, DFT, RDFT, etc, can be used to adjust the active filter current reference as shown in FIG. 5c. By calculating the amplitude and phase of the currents drained by the non-linear load 5 on the low voltage side 22 of each distribution transformer 3, mainly the fundamental, the 5th and 7th harmonics, the loading unbalance between the secondary 2 of the 12 pulse system can be determined. By using the expressions shown in FIG. 5c and as given below, the remaining 45th and 47th current harmonics on the primary side of the transformer can be determined. The current references of the installed active filters 24 are then adjusted according to the system characteristics and expressions shown in FIG. 5c:

$$\Delta 5th = \left|\frac{X_{5th\_1}}{n_a}\right| - \left|\frac{\sqrt{3}X_{5th\_2}}{n_b}\right|$$

$$\Delta 7th = \left|\frac{X_{7th\_1}}{n_a}\right| - \left|\frac{\sqrt{3}X_{7th\_2}}{n_b}\right|$$

$$i^*_{L\_1} = i_{L\_1} - (i_{L\_1st\_1} + i_{L\_5th\_1} + i_{L\_7th\_1} - k_2 n_a (\Delta 5th + \Delta 7th))$$

$$i^*_{L\_2} = i_{L\_2} - \left(i_{L\_1st\_2} + i_{L\_5th\_2} + i_{L\_7th\_2} + \frac{k_1 n_b}{\sqrt{3}}(\Delta 5th + \Delta 7th)\right)$$

$\Delta 5th$ and $\Delta 7th$ respect the transformer phase shift

To enable that all active filters 24 installed in each low voltage side 22 of the distribution transformers 3 process similar harmonic amplitudes $k_1$ and $k_2$ are given below:

$$k_1 = \frac{n_A}{n_A + \frac{n_B}{\sqrt{3}}} \quad k_2 = \frac{\frac{n_B}{\sqrt{3}}}{n_A + \frac{n_B}{\sqrt{3}}}$$

for one active filter installed on the lagged voltage transformer:

$$k_2=1 \; k_2=0$$

for one active filter installed on the lead voltage transformer:

$$k_1=0 \; k_2=1$$

For a 12 pulse systems typically $n_B = n_A\sqrt{3}$.

Figure 6:
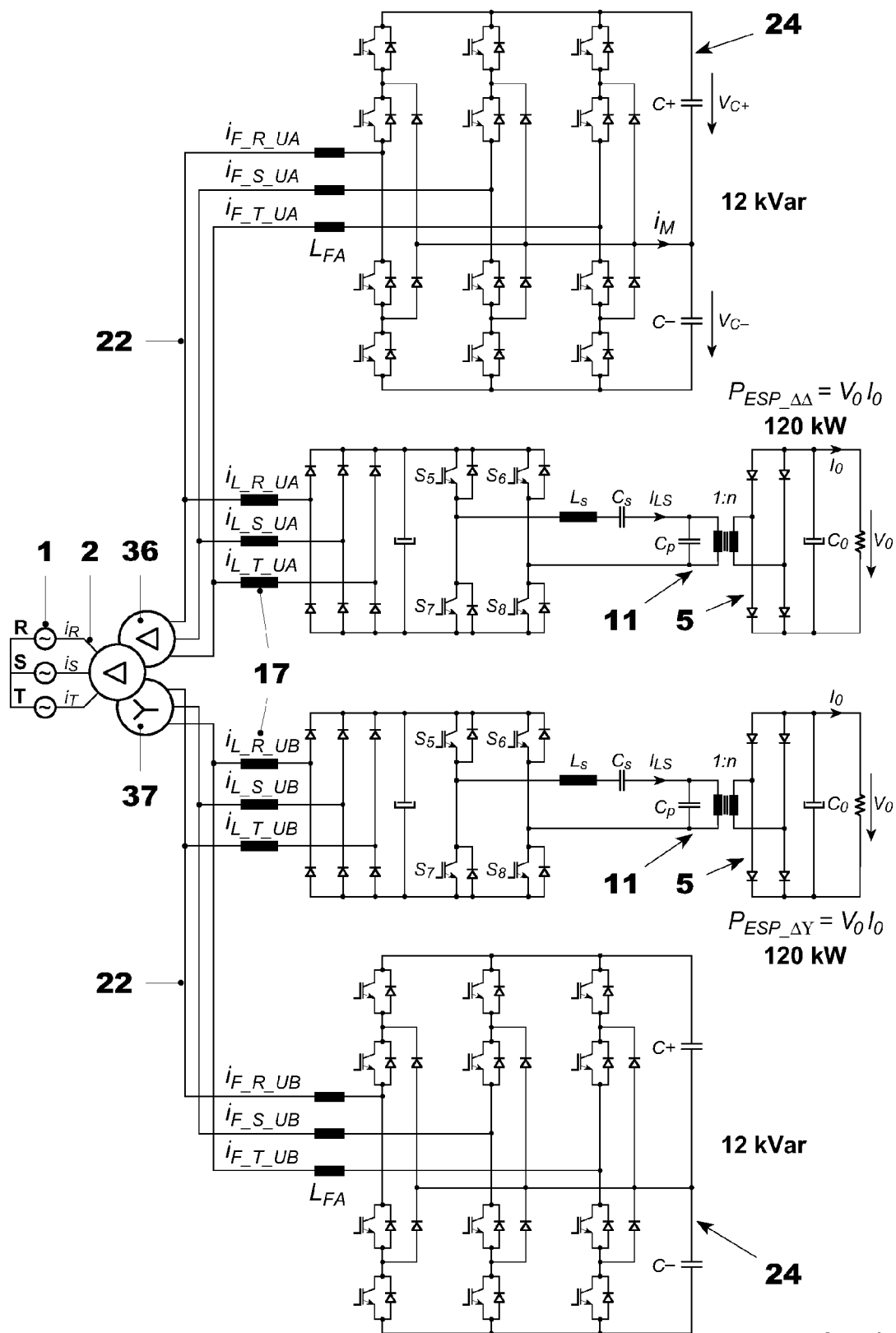
FIG. 6 shows an ESP system comprising a 12 pulse system and two active filters; the gray shaded background diodes of the active filter are SiC Schottky diodes; for the simulation for validating the theory, the gray active filter and the Dd0 transformer are not employed (cf. experimental section)
Figure 7:
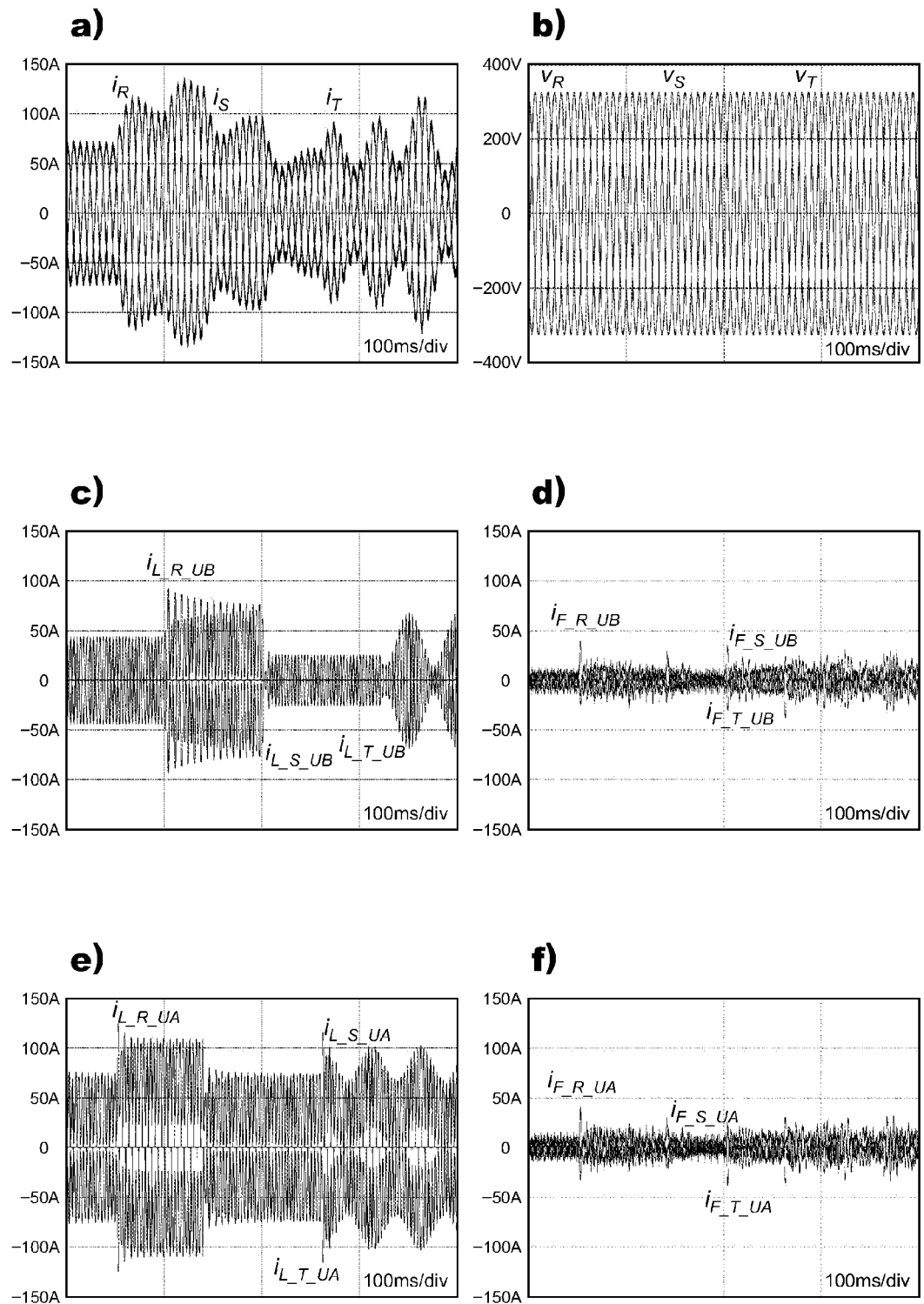
FIG. 7 shows an highly dynamic loading analysis: (a) System's line current; (b) Mains' voltage; (c) ESP power supply B's line currents; (d) Active filter B's line currents; (e) ESP Power supply A's line currents; and (f) Active filter A's line currents.
Figure 8:
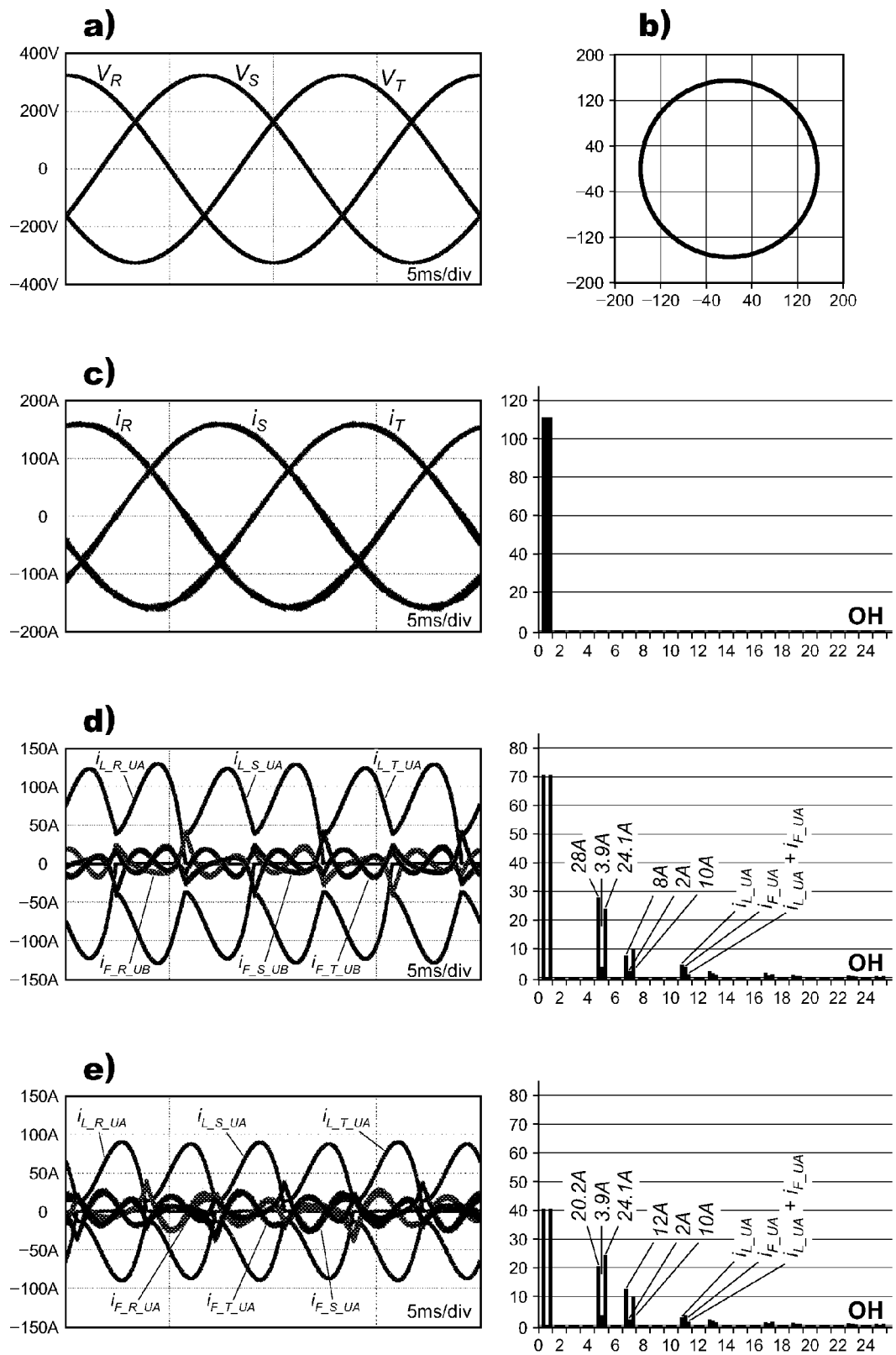
FIG. 8 shows a transformers unbalanced loading analysis: (a) Mains voltage; (b) Line currents' Loci diagram; (c) System's line current and harmonic analysis; (d) ESP power supply B and Active filter B's line currents; (e) ESP Power supply A and Active filter A's line currents, wherein in the bar graphs of d) and e) at each harmonic the left side bar represents the non linear load current harmonic, the center bar represents the current generated by the active filters 24, and the right side bar represents the current harmonics in the secondary side of the two transformers.
Figure 9:
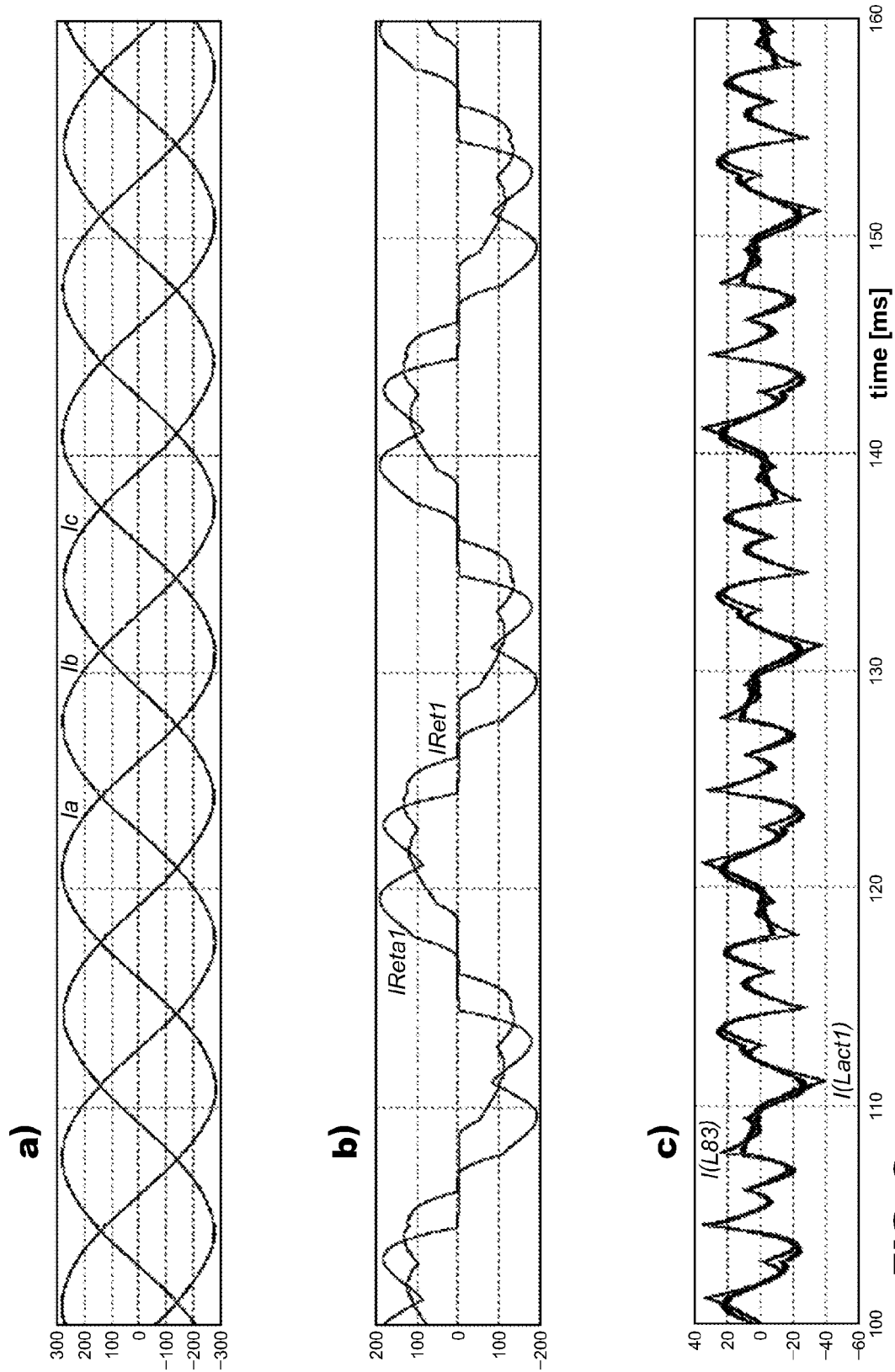
FIG. 9 shows the situation for transformers with asymmetric parameters: (a) Line currents; (b) Single phase's load current for Unit A and B; and (c) Single phase active filter's currents for Unit A and B.
Figure 10:
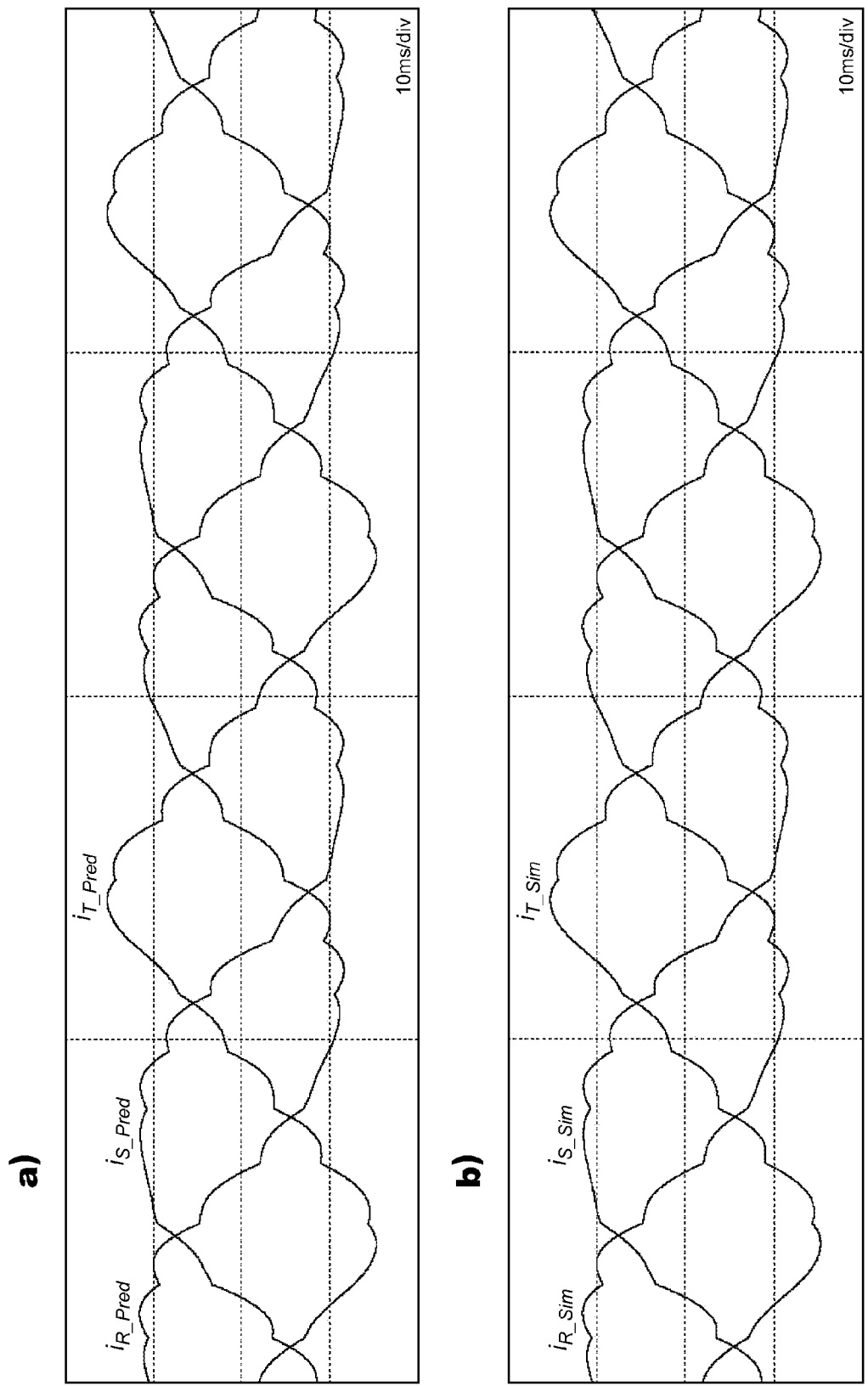
FIG. 10 shows the situation for transformers with asymmetric parameters and adjusted transformer model: (a) Model's current predicted; (b) Line currents for the multi-pulse system without active filter.
Figure 11:
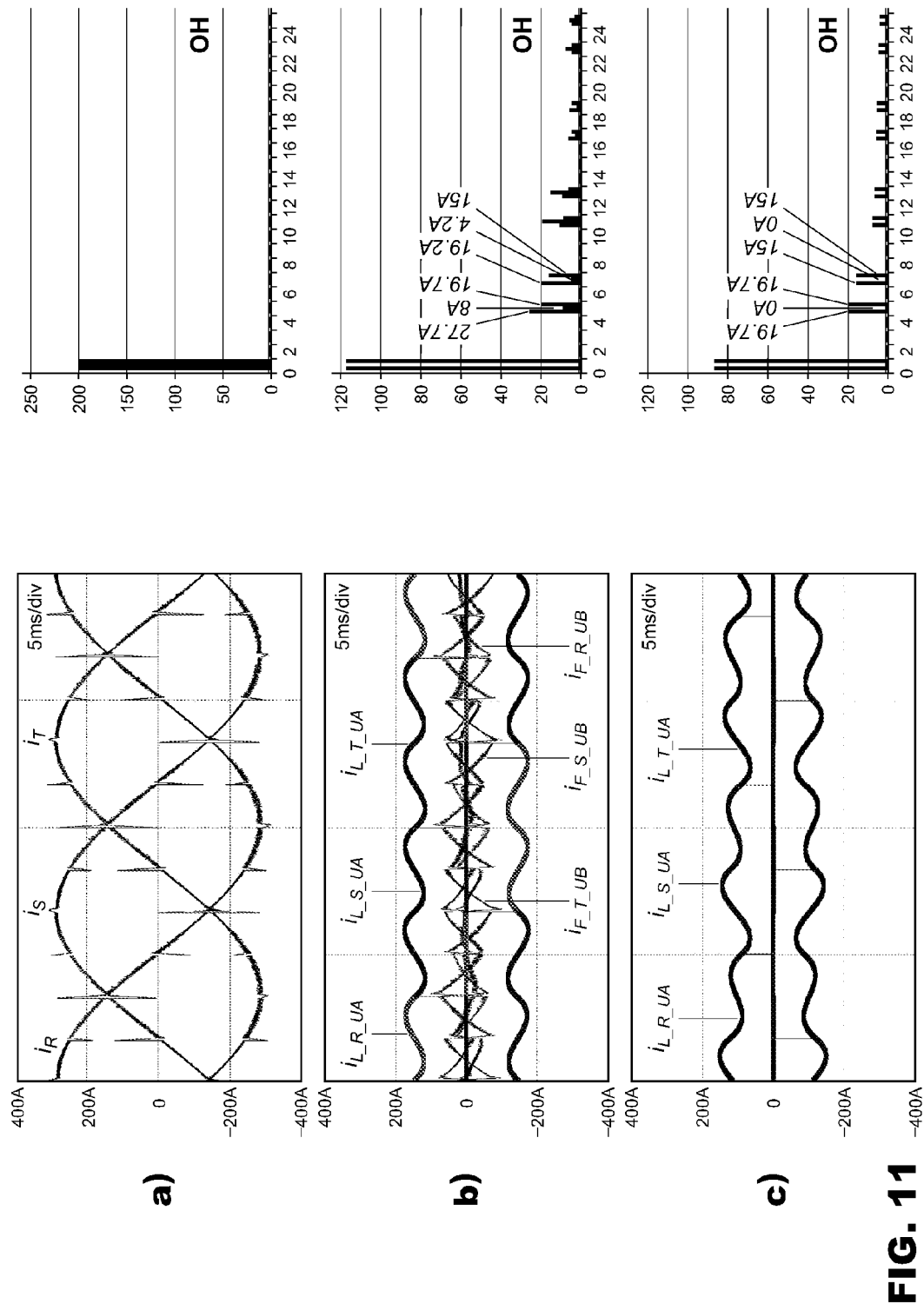
FIG. 11 shows a transformers unbalanced loading analysis: (a) Line Currents and harmonic analysis; (b) ESP power supply A's line current and active filter's current analysis; and (c) ESP power supply B's line current and harmonic analysis, wherein in the bar graphs of d) and e) at each harmonic the left side bar represents the non linear load current harmonic, the center bar represents the current generated by the active filters 24, and the right side bar represents the current harmonics in the secondary side of the two transformers.

In order to verify the proposed study, the following simulations were performed for the ESP system depicted in FIG. 6:
a) The system performance for highly dynamic ESP loading, where two active filters 24 are installed on the secondary side 22 of the 12 pulse system 3 with ac-side smoothing inductor 17 ESP power supplies 11, are shown in FIG. 7. As one can observe, the active filters 24 could effectively compensate the current harmonics and the system draws sinusoidal current from the mains (see FIG. 7(a)). Although the two transformers 3 process different amounts of power (see FIGS. 7(c) and 7(e)), the active filters 24 process the same amount of reactive power (see FIGS. 7(d) and 7(f)).
b) The current harmonic analysis for the case where the transformers operate with unbalanced loading is shown in FIG. 8. Here, one can observe that the mains currents have sinusoidal waveform (see FIG. 8(c), also the loci diagram in FIG. 8(b)), and the current harmonics generated by the active filters 24 are of the same amplitude (center bars at each harmonic in the bar diagrams on the right side of FIGS. 8 c, d and e). The current harmonics on the secondary side 22 of the two transformers 3 are of the same amplitude (right side bars at each harmonic in the bar diagrams on the right side of FIGS. 8 c, d and e), which helps the transformer to effectively compensate the 5th and 7th harmonics.
c) The proposed system behaviour for the case where transformer parameters are asymmetric is shown in FIG. 9. Here, the transformer turns ratio and the leakage inductances for each transformer's windings are set to be asymmetric (Dd0: nR=1.03 ($L_{\phi R}$=100 μF), nS=0.99 ($L_{\phi S}$=350 μF), nT=1.02 ($L_{\phi T}$=50 μF); Dy1: R=1.732 ($L_{\phi R}$=80 μF), nS=1.698 ($L_{\phi S}$=200 μF), nT=1.767 ($L_{\phi T}$=400 μF)). As one can observe, the system using the ideal model of the transformer for generating the current references has good performance for this test condition. Thus, the effort to obtain a more accurate transformer model is not justified.
d) In order to verify the characteristic of the mathematical model adjustment over transformer asymmetries on the transformer's windings turns ratio, one can simulate the case where the transformer's windings are set to be: Dd0: nR=1.0, nS=1, nT=1.0; and Dy1: nR=1.05√3, nS=√3, nT=0.87√3. Here, the proposed control determines the transformer's asymmetries on the single phase windings' turns ratio n by calculating the voltage rms value on the secondary side of the transformers ($u_{Sync\_1}$ and $u_{Sync\_2}$). FIG. 10 shows both the model predicted current on the primary side of the transformer (see FIG. 10(a)) and the obtained multi-pulse system currents (see FIG. 10(b)). As one can observe, the predicted currents are very similar to the simulated one, validating the model adjust strategy.
e) The 12 pulse system is now feeding two ESP power supplies 11 with dc-side smoothing inductors 17 with one active filter 24 connected to the Dd0 transformer's secondary side 22. The current harmonic analyses, for the case where the transformers operate with unbalanced loading are shown in FIG. 11. One can observe that the mains currents have sinusoidal waveform (see FIG. 11(a)). Note that the current harmonics in the secondary side of the two transformers are of the same amplitude (right side bars at each harmonic in the bar diagrams on the right side of FIGS. 11 b and c), which helps the transformer to effectively compensate the 5th and 7th harmonics.

As can be observed in FIGS. 7 to 11, the proposed transformer model can be used to adjust the current reference of typical active filter controls, without degrading its performance even in cases where the parameters of the transformer are asymmetric (see FIGS. 7 and 9). To have an enhanced performance when the transformer parameters are highly asymmetric, the synchronization voltages $u_{Sync\_1}$ and $u_{Sync\_2}$ can be used to calculate the voltage's rms value on the secondary side of the transformers in order to perform adjustments on the proposed mathematical model (see FIG. 10).

The proposed transformer's model can be used in a multi-pulse system configuration with either one or more active filters (see FIGS. 8 and 11). For single active filter solution, all the reactive power, which the multi-pulse system 3 could not eliminate, will be processed by this converter. For the multiple active filter solution, all the reactive power is equally shared between the active filters. Moreover, the proposed strategy can be used for ESP systems, comprising power supplies either in configuration with dc- or ac-side smoothing inductors (see FIGS. 8 and 11).

Figure 12:
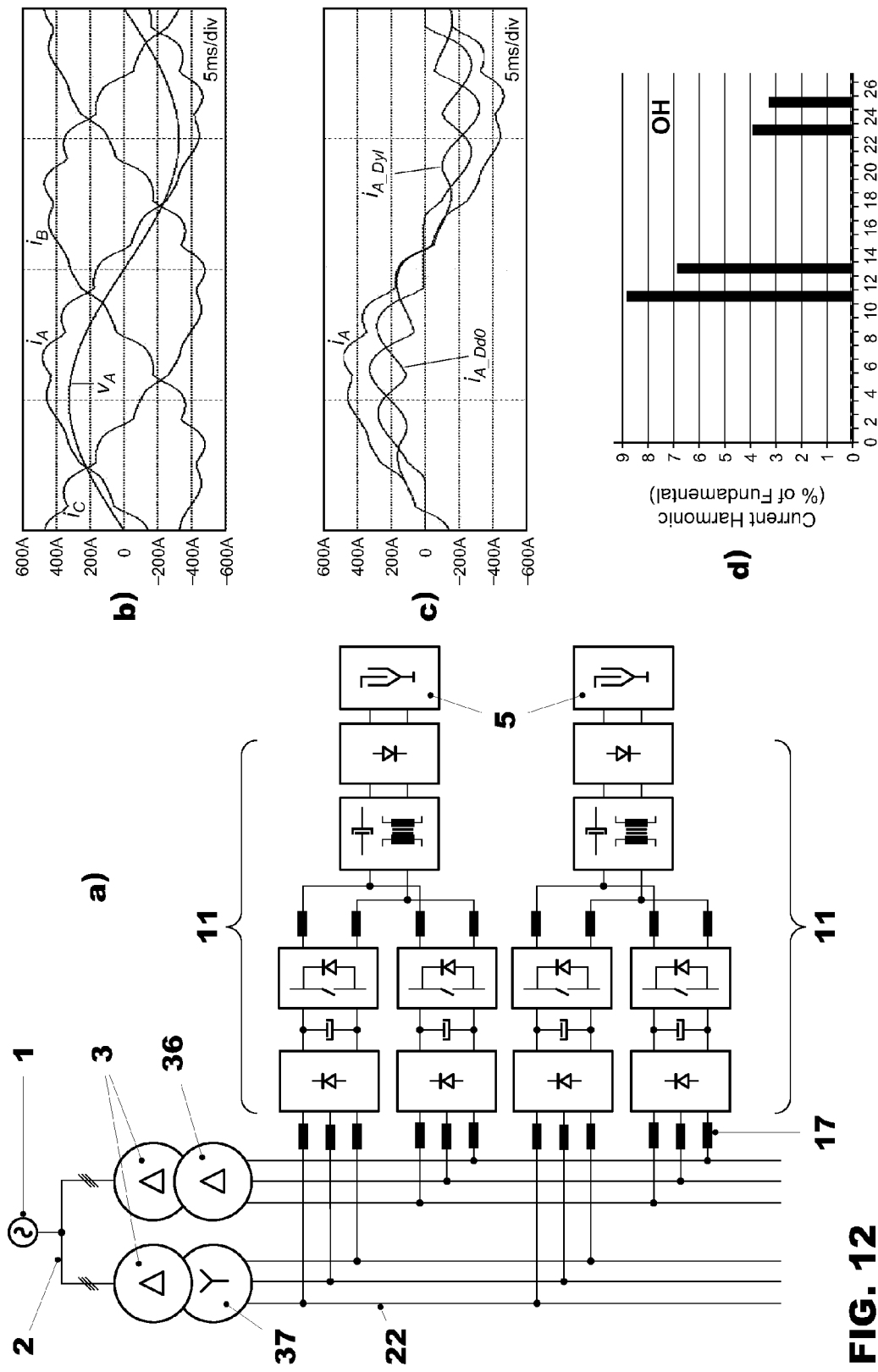
FIG. 12 shows a 12 pulse system transformers unbalanced loading analysis: (a) 12 pulse system configuration; (b) 3 phases line currents and voltage; (c) Dd0 and Dy1 transformer's primary current and equivalent line current; and (c) Line current harmonic analysis.

Note that if the 12 pulse system total loading is equally shared by the two transformers as proposed in FIG. 12(a), the system naturally has the 5th and 7th harmonics balanced (see FIGS. 12(b), 12(c) and 12(d)). In this configuration the power processed by an installed active filter 24 is reduced, because it only processes >7th current harmonics. However, to employ this solution, one can consider an increment in the total installation cost, which would be mainly originated from the necessity of more power cabling.

Figure 13:
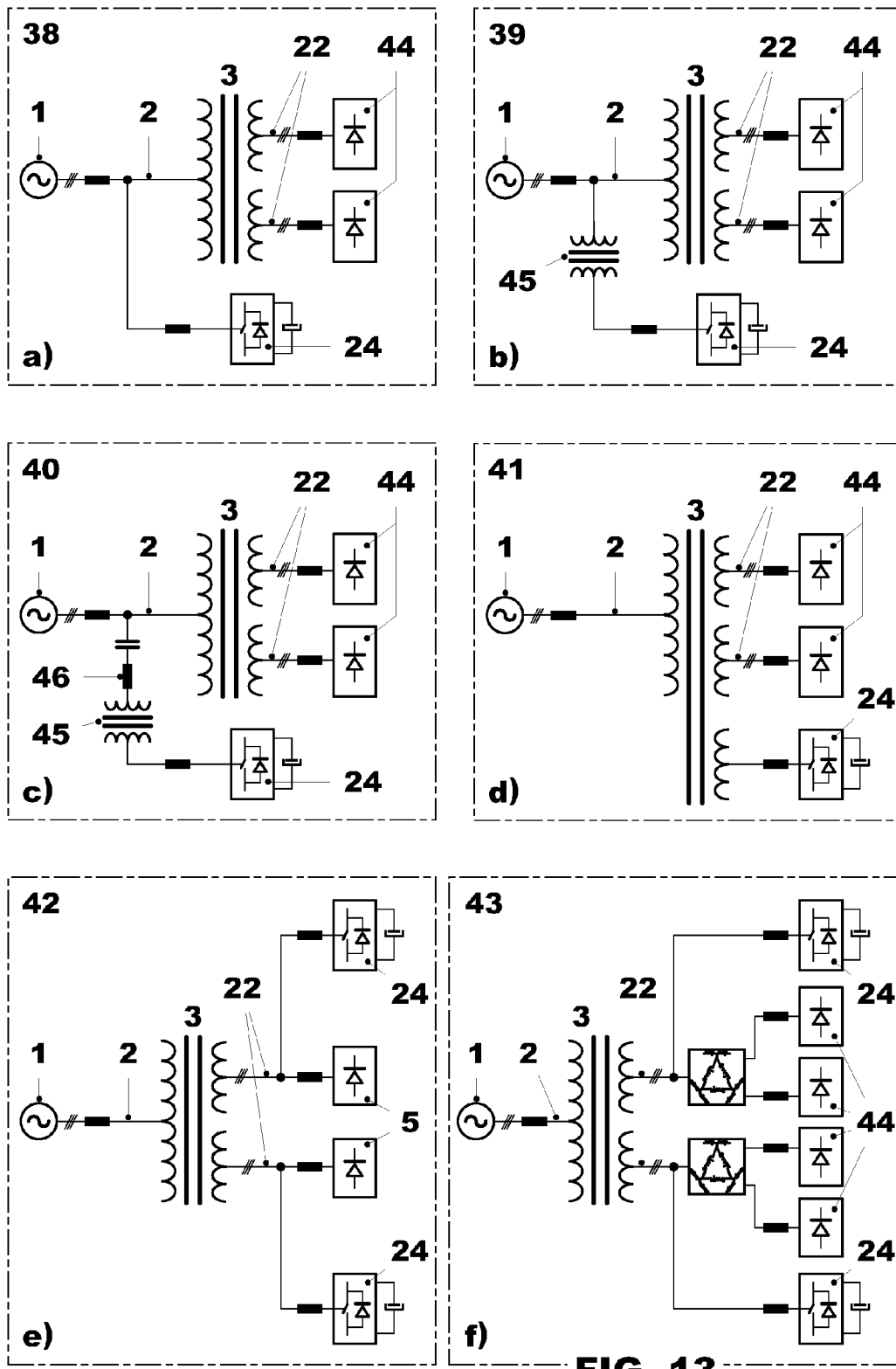
FIG. 13 shows alternatives for positioning the active filter for typical ESP systems.

An ESP system, which complies with harmonic guide lines by utilizing the combination of multi-pulse systems and active filter solutions can be arranged as described in the following:
a) The active filter solution 24 is directly connected to the medium voltage side 2 of the multi-pulse transformer 3 as shown in FIG. 13(a). In this configuration, medium-voltage semiconductors/sensors are required, which increases the cost of the active filter solution 24. Moreover, switches for high voltage and relatively low current results in poor utilization of the semiconductor.
b) In order to overcome the drawbacks of the configuration depicted in FIG. 13 (a), one can use an external MV/LV transformer 45 to feed the active filter 24 as illustrated in FIG. 13(b). In this case, better utilization of the active filter semiconductors can be achieved; however, one additional MV/LV transformer 45, which processes the same amount of power as the active filter 24, is required increasing the cost of the system.
c) In order to reduce the power processed by both the active filter 24 and the additional transformer 45 proposed in FIG. 13(b), a hybrid filter solution can be used as shown in FIG. 13(c). In this case, good utilization of the semiconductors and a more efficient system can be achieved (less power processed by the active filter); however, high voltage rating passive elements 46 are required. Moreover, in the case of unbalanced loading on the secondary windings of the multi-pulse transformer, the system would not fully compensate the line's 5th and 7th currents harmonics, and additional 5th and 7th harmonic passive filters could be necessary.

d) A system configuration with a special MV/LV transformer 3 is shown in FIG. 13 (d). In this case, the active filter 24 is installed on the low voltage side 22 of the transformer 3, but the additional cost of the special distribution transformer 3 would be very high.

e) A system with active filters 24 directly installed on the low voltage side 22 of the transformer is shown in FIG. 13(e). In this case, there is the possibility of using either only one active filter structure 24 or one active filter 24 for each secondary windings of the transformer. The active filters 24 are intended for high order harmonic-current-mitigation (>7th harmonic), and for balancing the 5th and 7th current harmonics, which can be effectively eliminated by the multi-pulse system 3 in cases where the transformers' loading are unbalanced. Due to the fact that the active filters 24 are installed on the low voltage transformer side 22, IGBTs and circuit components with better loss and insulation characteristics are used.

f) A system with active filters 24 directly installed on the low voltage side of the transformer together with a multi-pulse system 3 built with autotransformers and non-linear loads 44, which can be ESP power supplies 11, are shown in FIG. 13(f). In this case, there is no need for MV/LV transformers configured as multi-pulse system; however, an autotransformer processing of about 20% of the ESP loading power will be required (high cost). Typical commercial available active filters can be employed.

Figure 14:
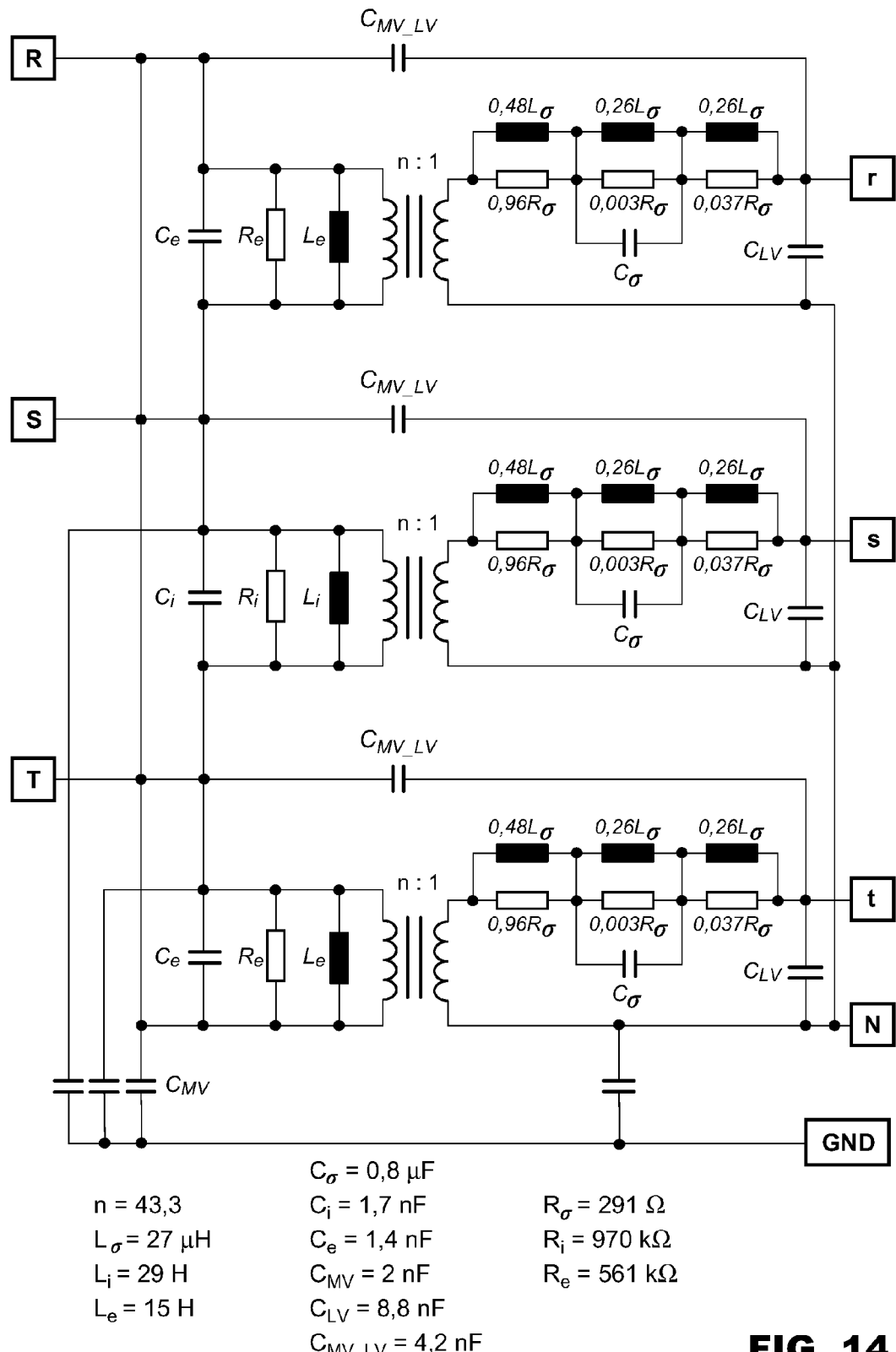
FIG. 14 shows a realistic MV/LV Dy1 oil power transformer frequency dependent model.
Figure 15:
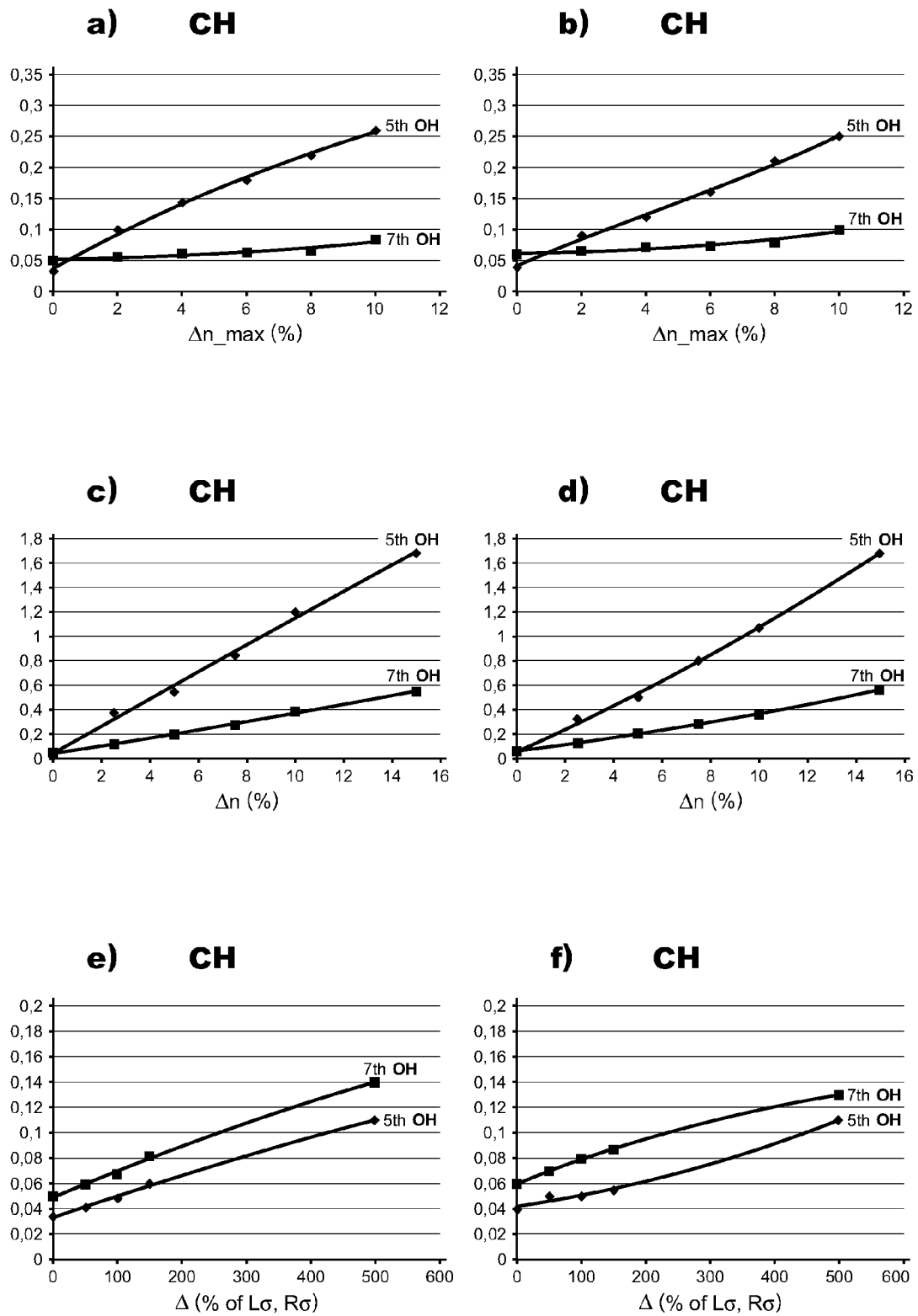
FIG. 15 shows an ESP system's performance evaluation against transformer asymmetries and parasitic variations: (a) Line current harmonic analysis for symmetric Dd0 transformer and for changing Dy1 transformer's turns ratio asymmetries between windings for one active filter solution and (b) for two active filter solutions; (c) Line current harmonic analysis for both symmetric Dd0 and Dy1 transformers, but with changing Dy1 transformer's turns ratio for one active filter solution and (d) for two active filter solutions; (e) The influence of the transformer's parasitic variation (leakage inductance and windings resistance) against the system's 5th and 7th current harmonics mitigation performance for or one active filter solution and (f) for two active filter solutions.

As can be observed in FIG. 5, the proposed active filter reference current generation strategy does not consider the parasitic character or asymmetries of the system's transformers. In order to analyse the parasitic effect on the system performance employing the proposed ideal transformer current model, the frequency dependent model of a MV/LV oil power transformer presented by B. Kaku et al., IEEE Proceedings, electric power applications, Vol. 144, pp 182-190, 1997 is considered for evaluation (c.f. FIG. 14). Simulations of the system depicted in FIG. 6, assuming an ideal Dd0 transformer and a realistic Dy1 transformer, were performed as described in the following:

a) The influence of the transformer's turns ratio asymmetries between the secondary windings of the realistic Dy1 transformer on the system's 5th and 7th current harmonics mitigation is investigated. A graph plotting the remaining 5th and 7th current harmonics (in percentage of the fundamental component) on the system's MV side in dependent on the maximum percentage of turns ratio variation between the Dy1 transformer's secondary windings is depicted in FIG. 15 (FIG. 15(a) for one AF and 15(b) for two AF solutions). As can be observed, the system line quality is preserved even for a highly asymmetric transformer. Moreover, the current mitigation performance for the one or two active filter solution is very similar.

b) Both Dd0 and Dy1 transformers are considered with symmetric phase characteristics (for each transformer the secondary windings have similar parasitic and turns ratio values); however the turns ratio of the Dy1 transformer varies proportionally to the theoretical value for a 12 pulse system $((\Delta n+1)n\sqrt{3})$. Here, the transformer current reference model is not adjusted. FIGS. 15(c) and 15(d) show the 5th and 7th line current harmonic mitigation performance as percentage of the fundamental component for one AF and two AF solutions, respectively. As can be observed, the proposed transformer model generates an error on the active filter reference signals, which can degrade the systems mitigation performance. To overcome this drawback, the synchronization voltages $u_{Sync\_1}$ and $u_{Sync\_2}$ can be used to calculate the voltage rms values on the secondary side 22 of the transformers to perform the necessary adjustment on the reference mathematical model (see also FIG. 10).

c) The influence of the transformer's parasitic variation (leakage inductance and windings resistance) against the system's 5th and 7th current harmonics mitigation performance is investigated. The variation on the transformer's parasitic character is executed symmetrically in each one of the Dy1's realistic phases parameters as $(\Delta+1)L\sigma$ and $(\Delta+1)R\sigma$. FIGS. 15 (e) and 15(f) present the results obtained with this experimentation for one active filter 24 and two active filter 24 solutions, respectively. As one can observe, the system line quality is preserved even for a high parasitic components values of the transformer.

The line quality improvement achieved with the proposed ESP system is also verified experimentally. So in order to validate the proposed transformer model the circuit set-up shown in FIG. 6 was set up. The transformer utilized to phase shift the primary to the secondary windings by 30 degrees is a Dy1 type transformer with turns ratio of $\sqrt{3}:1$. An 12 kVAr active filter is added on the Dd0 transformer secondary side to mitigate the remaining harmonics of the constructed 12 pulse system. The test set-up circuit diagram is shown in FIG. 6 however the Dd0 transformer is not employed and only one active filter is used.

Figure 16:
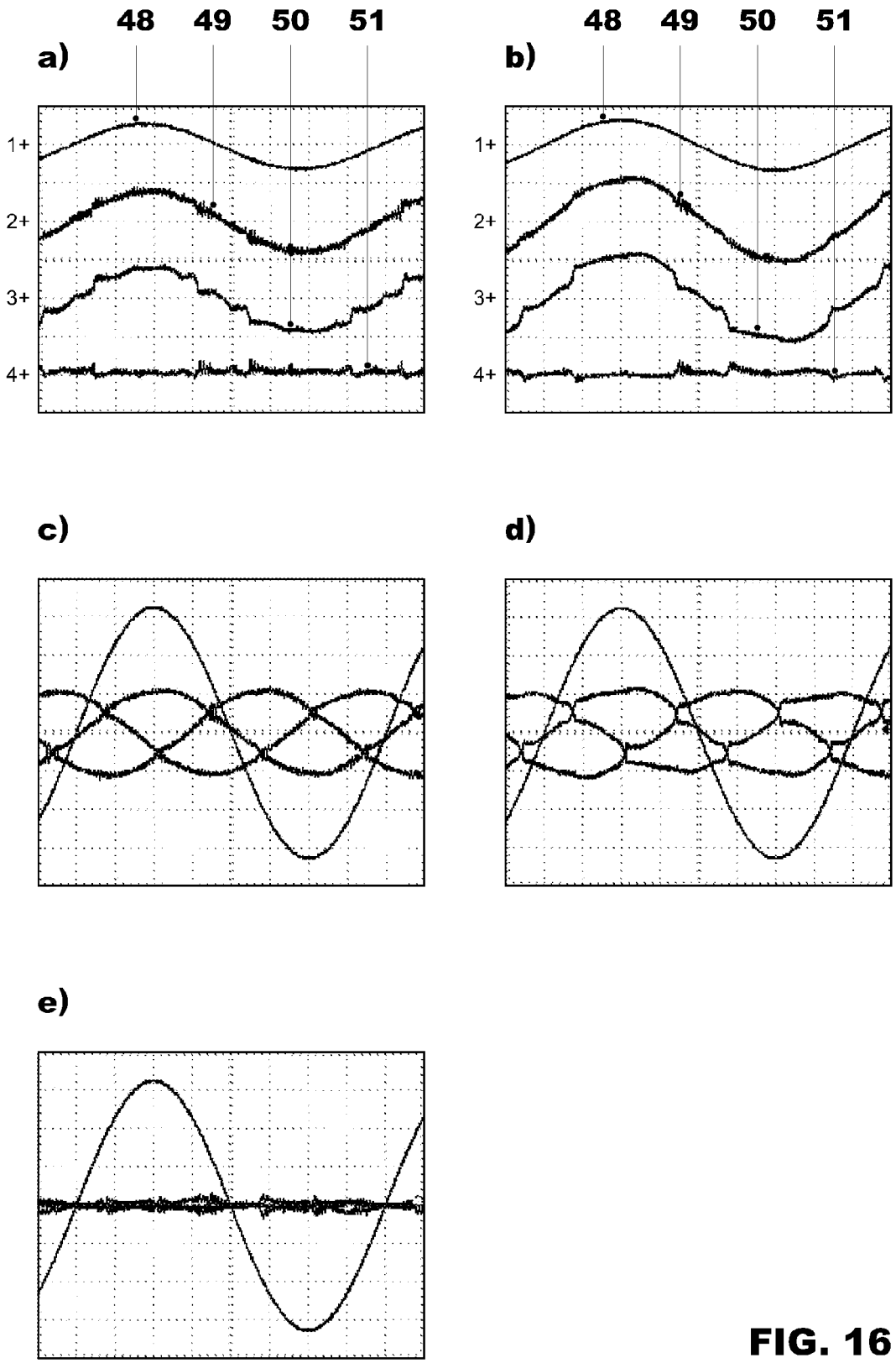
FIG. 16 shows in a) experimental results for a balanced 12 pulse system: mains voltage (48); line current (49); 12 pulse current without compensation (50); and active filter current (51); in b) experimental results for unbalanced 12 pulse system: mains voltage (48); line current (49); 12 pulse current without compensation (50); and active filter current (51); in c) experimental results: line currents for unbalanced 12 pulse system; in d) experimental results: 12 pulse currents for unbalanced 12 pulse system; and in e) experimental results: active filter compensation currents for unbalanced 12 pulse system.

Results are given in FIG. 16 a)-e). FIG. 16 a shows the case where the 12 pulse transformers have balanced loading, and for this reason the active filter processes only high order harmonics (>7th harmonics). FIG. 16 b to FIG. 16 e present the experimental waveforms for the unbalanced 12 pulse system.

As can be noted in FIG. 16, the ESP system can comply with harmonic guidelines as the drained line currents have sinusoidal shape. Therefore, the proposed transformer current active filter controls, without degrading the system performance even in cases where the parameters of the 12 pulse transformer are asymmetric.

As shown in FIG. 16, the shunt active filter could efficiently compensate the current harmonics with order higher than the 7th order. In addition, it adjusted the 5th and 7th harmonics on the Dd0 secondary side to be of the same amplitude as the ones on the Dy1 secondary side. In this way, the 12 pulse system could eliminate the 5th and 7th harmonics, and the studied ESP system drained close to sinusoidal shaped line currents.

| LIST OF REFERENCE SIGNS | |
|---|---|
| 1 | mains, common feeding |
| 2 | low or medium voltage level line, primary side of the transformers |

-continued

LIST OF REFERENCE SIGNS

| | |
|---|---|
| 3 | distribution transformer, 12 pulse system |
| 4 | gas flow loaded with particles, e.g. coal dust |
| 5 | electrostatic precipitator |
| 6 | inlet field |
| 7 | middle fields |
| 8 | outlet field |
| 9 | stack |
| 10 | cleaned exhaust gas |
| 11 | power supply |
| 12 | input rectifier |
| 13 | full bridge inverter |
| 14 | resonant tank |
| 15 | output rectifier |
| 16 | transformer and non idealities |
| 17 | AC side smoothing inductor |
| 18 | DC link capacitor |
| 19 | capacitor in series |
| 20 | inductor in series |
| 21 | transformer |
| 22 | low voltage level, secondary side of the transformer |
| 23 | DC side smoothing inductor |
| 24 | active filter |
| 25 | current sensor on low voltage level, active filter current reference |
| 26 | voltage sensor on low voltage level |
| 27 | active filter line |
| 28 | primary current prediction |
| 29 | secondary current adjusted reference, final input reference for active filter |
| 30 | space vector modulation |
| 31 | transformer current model |
| 32 | ideal transformer model |
| 33 | low pass filter |
| 36 | ΔΔ transformer |
| 37 | ΔY transformer |
| 38 | direct connected on the medium voltage side |
| 39 | connected on the medium voltage side by a transformer |
| 40 | hybrid filter connected on the medium voltage side |
| 41 | extra windings on the low voltage side |
| 42 | active filter connected in each secondary winding |
| 43 | active filter connected in each secondary windings and autotransformer |
| 44 | nonlinear load |
| 45 | transformer for active filter |
| 46 | high pass filter for 11th, 13th order of harmonic |
| 47 | extra winding on the low voltage side |
| 48 | mains voltage |
| 49 | line current |
| 50 | 12 pulse current without compensation |
| 51 | active filter current |
| CH | current harmonic (% of fundamental) |
| ESP | electrostatic precipitator |
| OH | order of harmonic |
| PLL | phase locked loop |
| PS1 | power supply 1 |
| PS2 | power supply 2 |
| ... | |
| PSn − 1 | power supply n − 1 |
| PSn | power supply n |

The invention claimed is:

1. Method for the improvement of the line quality in a system, comprising:
    feeding via a common feeding with at least one distribution transformer at least two non-linear loads drawing non-sinusoidal currents from the common feeding;
    wherein between the common feeding and the distribution transformer there is at least one primary side transformer line and between the at least one distribution transformer and the at least two non-linear loads there is at least one lower voltage secondary side transformer line;
    wherein at least one active filter attached to at least one lower voltage secondary side transformer line is used for the attenuation or elimination of higher order harmonics experienced by the common feeding;
    wherein synchronization voltages are measured on the lower voltage secondary side transformer line and are used to calculate the voltage rms values on the secondary side transformer line as an adjustment for asymmetries, parasitic character, or a combination thereof of the transformer, wherein the current in the transformer line is used to control the active filter; and
    wherein said current in all lower voltage secondary side transformer lines is not directly used as an input reference for the active filter but from said current in the lower voltage secondary side transformer lines, using a computational model of the distribution transformer, the current on the primary side transformer line is calculated, and therefrom, using a computational model of the distribution transformer, the current on the secondary side transformer line is back calculated, and this current is used as input reference to the active filter.

2. Method according to claim 1, wherein the currents in all lower voltage secondary side transformer lines are measured and used for the control of the active filter.

3. Method according to claim 1, wherein the distribution transformer is a 12 pulse transformer, selected from the group of Ddn, Dyn, Dzn, Ydn, Yyn, Yzn, with n selected from 0, 1, 5, 6, or 11, or in case of several transformers combinations of Ddn, Dyn, Dzn, Ydn, Yyn or Yzn.

4. Method according to claim 1, wherein two distribution transformers, both 12 pulse transformers, are transforming from the primary side of the transformer line to two lower voltage secondary side transformer lines, wherein the 12 pulse transformers are selected from the group Dd0-Dy1, Dy1-Dz2, Yd1-Dd0, Dz0-Dy1.

5. Method according to claim 1, wherein at least two distribution transformers, transform from the primary side of the transformer line to at least two lower voltage secondary side transformer lines, and wherein in at least two lower voltage secondary side transformer lines active filters are located, and wherein each lower voltage secondary side transformer line is equipped with an active filter controlled by reference signals calculated based on measurements in each and every lower voltage secondary side transformer line.

6. Method according to claim 1, wherein the non-linear load is a transistor based power supply element, including a switched full bridge inverter power supply, for an electrostatic precipitator.

7. Method according to claim 1, wherein the non-linear load is a transistor based power supply element comprising an input rectifier and a transistor based full bridge inverter, followed by at least one of resonant tank, a transformer unit and an output rectifier, wherein on at least one of the input side of the full bridge inverter and its output side, smoothing inductors are arranged.

8. Method according to claim 1, wherein the active filter control strategy is selected from the group of dq-frame, PQtheory, Fryze currents, generalized integrators, frequency domain strategies DFT, RDFT and FFT.

9. The method according to claim 1, wherein the method is used for continuous current or pulsed operation of an electrostatic precipitator unit with at least two power supplies with transistor based full bridge inverter elements.

10. High power distribution system comprising:
a common feeding which, via at least one distribution transformer feeds at least two non-linear loads drawing non-sinusoidal currents from the common feeding;
wherein between the common feeding and the distribution transformer there is a primary side of the transformer line and between the at least one distribution transformer and the loads there is at least one lower voltage secondary side of the transformer line;
wherein at least one active filter is attached to at least one lower voltage secondary side of the transformer line for the attenuation or elimination of higher order harmonics experienced by the common feeding;
wherein synchronization voltages are measured on the lower voltage secondary side transformer line and are used to calculate the voltage rms values on the secondary side transformer line as an adjustment for asymmetries, parasitic character or a combination thereof character of the transformer, wherein the current in the transformer line is used to control the active filter; and
wherein at least one sensor is provided in at least one lower voltage secondary side of the transformer line sensing the current in said line used for the control of the active filter, wherein computational means are provided using said current and a computational model of the distribution transformer to calculate the current on the primary side of the transformer line, and therefrom, using a computational model of the distribution transformer to calculate the current on the primary side of the transformer line, and therefrom, using a computational model of the distribution transformer, the current on the secondary side of the transformer line, and this current is input reference to the active filter, taking into account synchronization voltages measured via further sensors on the lower voltage secondary side of the transformer line to calculate the voltage rms values on the secondary side of the transformers.

11. Distribution system according to claim 10, wherein the distribution transformer is a 12 pulse transformer, selected from the group of Ddn, Dyn, Dzn, Ydn, Yyn, Yzn, with n selected from 0, 1, 5, 6, or 11, or in case of several transformers combinations of Ddn, Dyn, Dzn, Ydn, Yyn or Yzn, wherein two distribution transformers, both 12 pulse transformers, are present transforming from the primary side of the transformer line to two lower voltage secondary side of the transformer lines, wherein the 12 pulse transformers are selected from the group Dd0-Dy1, Dy1-Dz2, Yd1-Dd0, Dz0-Dy1.

12. Electrostatic precipitator unit comprising a distribution system according to claim 10.

* * * * *

UNITED STATES PATENT AND TRADEMARK OFFICE
CERTIFICATE OF CORRECTION

PATENT NO. : 9,331,561 B2
APPLICATION NO. : 13/701086
DATED : May 3, 2016
INVENTOR(S) : Kolar et al.

It is certified that error appears in the above-identified patent and that said Letters Patent is hereby corrected as shown below:

On the Title Page, in item (75), under "Inventors", in Column 1, Line 1, delete "Zurich" and insert -- Zürich --, therefor.

On the Title Page, in item (75), under "Inventors", in Column 1, Line 2, delete "Zurich" and insert -- Zürich --, therefor.

On the Title Page, in item (75), under "Inventors", in Column 1, Line 4, delete "Vaxjo" and insert -- Växjö --, therefor.

On the Title Page, in item (73), under "Assignee", in Column 1, Line 1, delete "Ltd," and insert -- Ltd., --, therefor.

In the specification

In Column 4, Line 3, delete "$u_{sync\_n}$" and insert -- $u_{Sync\_n}$ --, therefor.

In Column 5, Line 54, delete "strategy" and insert -- strateg; --, therefor.

In Column 5, Line 57, delete "$i_{L,T\_ua}$" and insert -- $i_{L,T\_UA}$ --, therefor.

In Column 7, Line 15, delete "trough" and insert -- through --, therefor.

In Column 7, Line 52, delete "trough" and insert -- through --, therefor.

In Column 8, Line 38, delete "clue" and insert -- due --, therefor.

In Column 10, Line 1, delete "$k_1$" and insert -- $i_{L\_1}$ --, therefor.

In Column 10, Line 29, delete "$U_{Sync\_2}$" and insert -- $u_{Sync\_2}$ --, therefor.

Signed and Sealed this
Second Day of August, 2016

Michelle K. Lee
*Director of the United States Patent and Trademark Office*

CERTIFICATE OF CORRECTION (continued)
U.S. Pat. No. 9,331,561 B2

In the specification

In Column 10, Lines 45-46, delete "45th and 47th" and insert -- $\Delta$5th and $\Delta$7th --, therefor.

In Column 11, Line 11, delete "$k_2=1$" and insert -- $k_1=1$ --, therefor.

In Column 12, Line 5, delete "dc-side smoothing inductors 17" and insert -- dc-side smoothing inductors 23 --, therefor.